(12) United States Patent
Zahn et al.

(10) Patent No.: US 8,759,455 B2
(45) Date of Patent: Jun. 24, 2014

(54) TWO-STAGE CURABLE COMPOSITION CONTAINING A SURFACE-DEACTIVATED POLYISOCYANATE

(75) Inventors: Alain Zahn, Zürich (CH); Michael Schlumpf, Stallikon (CH); Urs Burckhardt, Zurich (CH)

(73) Assignee: Sika Technology AG, Baar (CH)

( * ) Notice: Subject to any disclaimer, the term of this patent is extended or adjusted under 35 U.S.C. 154(b) by 181 days.

(21) Appl. No.: 13/259,892

(22) PCT Filed: Mar. 31, 2010

(86) PCT No.: PCT/EP2010/054264
§ 371 (c)(1),
(2), (4) Date: Oct. 20, 2011

(87) PCT Pub. No.: WO2010/112537
PCT Pub. Date: Oct. 7, 2010

(65) Prior Publication Data
US 2012/0045652 A1  Feb. 23, 2012

(30) Foreign Application Priority Data
Mar. 31, 2009  (EP) ..................................... 09156891

(51) Int. Cl.
*C08F 283/04* (2006.01)
*C08L 75/04* (2006.01)
*B32B 37/12* (2006.01)

(52) U.S. Cl.
USPC ........................ 525/454; 156/331.7

(58) Field of Classification Search
USPC ....................... 156/331.7; 525/454
See application file for complete search history.

(56) References Cited

U.S. PATENT DOCUMENTS

| | | | |
|---|---|---|---|
| 4,618,651 A | 10/1986 | Gilch et al. | |
| 4,950,715 A | 8/1990 | Duck et al. | |
| 2010/0190014 A1* | 7/2010 | Burckhardt | 428/423.1 |
| 2012/0012251 A1* | 1/2012 | Burckhardt et al. | 156/331.7 |

FOREIGN PATENT DOCUMENTS

| | | |
|---|---|---|
| DE | 26 09 266 A1 | 9/1976 |
| DE | 33 10 294 C1 | 8/1984 |
| DE | 34 12 884 A1 | 10/1984 |
| EP | 0 062 780 A1 | 10/1982 |
| EP | 0 100 508 A2 | 2/1984 |
| EP | 0 125 008 A1 | 11/1984 |
| EP | 0 125 436 A1 | 11/1984 |
| EP | 0 153 579 A2 | 9/1985 |
| WO | WO 88/06165 A1 | 8/1988 |

OTHER PUBLICATIONS

International Search Report in International Patent Application No. PCT/EP2010/054264; dated Jun. 7, 2010 (with English-language translation).
International Preliminary Report on Patentability in International Application No. PCT/EP2010/054264; dated Nov. 1, 2011.

\* cited by examiner

*Primary Examiner* — Thao T. Tran
(74) *Attorney, Agent, or Firm* — Oliff PLC

(57) ABSTRACT

Single-component compositions are disclosed, which can be cured in two stages, wherein in the first curing stage, compositions pre-cured by means of moisture and having in particular plastic properties are formed, and wherein in the second curing stage, compositions cured by means of heat and having in particular elastic properties are formed. The two-stage compositions are suitable in particular as adhesives and have the great advantage that thanks to said two-stage compositions, an adhesive can be applied to a substrate, said adhesive cures by means of moisture in such a way that it can be handled and stored without problems, and said adhesive can be cured easily in an adhering step by means of heat only when needed.

11 Claims, 5 Drawing Sheets

TWO-STAGE CURABLE COMPOSITION CONTAINING A SURFACE-DEACTIVATED POLYISOCYANATE

TECHNICAL FIELD

The invention relates to the field of single-component curable compositions and their use as a two-stage curing adhesive.

STATE OF THE ART

Bonding processes are widely used in the production of goods, because the bonding achieved shows technical and commercial advantages over other joining techniques. Particularly with bonding processes with reactive chemically crosslinking, curing adhesives, it would often be desirable if the adhesive bonding to a part could be spatially or temporally decoupled from the actual adhesion, that is, the cohesive bonding of a part to be joined to another, in order, on the one hand, to speed up the joining process and, secondly, to avoid the handling of the adhesive, which, in production, often requires special application equipment, industrial safety measures, and also additional, purification stages. One way of achieving decoupling of the application of adhesives and the adhesion lies in using a two-stage, curing adhesive.

Two-stage curing adhesives, in the form of two-component systems, are known, from the State of the Art, in which the first curing stage is triggered by mixing the two components, and in which the second curing stage comes about through exposure to heat or UV, for example.

Heat-curing polyurethane compositions are known, from EP 0 062 780 A1 and EP 0 100 508 A2, which contain fine particle, solid isocyanates, which have been surface-deactivated through treatment with amines. The surface-deactivated isocyanates mainly occur here in combinations with polyols. These systems are storage-stable at room temperature, and harden at temperatures ranging from 70° C. to 180° C., without the release of volatile substances. To achieve fast curing, however, it is either necessary to use relatively high temperatures or very active catalysts, because the reaction of hydroxyl groups with isocyanate groups is rather slow. There is the risk of bubble formation during curing, especially where a certain time passes between application and the curing, since the composition can absorb moisture from the surroundings and $CO_2$ is formed in the reaction between isocyanates with water.

Corresponding systems are known, from EP 0153579 A2, in which polyols are at least partially replaced by polyamines. The above-mentioned problems can, indeed, be largely reduced in this way. These systems, however, have particular weaknesses with regard to elasticity and/or strength, and are therefore poorly suited to use as elastic adhesives. The choice of suitable polyamines with a sufficiently high molecular weight, so that elastic properties are obtained in the cured, final product, is also very limited. Either long-chain types of polyether polyamines, such as those commercially available, but relatively expensive, under the trade name Jeffamine® (from Huntsman) are used, or other suitable polymeric structures, with terminal amino groups, are manufactured, although these are associated with considerable expense. Other disadvantages arise from the presence of free amino groups of the polyamines. On the one hand, the amino groups undergo undesirable side reactions, with ester compounds or with carbon dioxide from the air, for example. On the other hand, the amino groups of the polyamines greatly restrict handling because of their basicity and corrosiveness, and there are problems of safety in the workplace.

DESCRIPTION OF THE INVENTION

The object of the present invention is therefore to provide a single-component, two-stage curing composition, which can particularly be used as an elastic adhesive, and which reacts, in the first curing stage, to form a pre-crosslinked material, and which reacts, in the second curing stage, to form a fully cured material.

This problem is solved by single-component compositions SCC in accordance with claim 1.

A single-component composition SCC, with the desired curing properties, can be obtained particularly well when a combination of at least one isocyanate-group-containing polyurethane polymer, at least one specific, blocked amine and at least one surface-deactivated polyisocyanate that is solid at room temperature, is used. In particular, these single-component compositions SCC are free of polyamines and are therefore non-corrosive and advantageous to handling and for safety at work. In addition, they harden very quickly when exposed to heat, and are essentially free of bubbles. In particular, where moisture is excluded, the single-component compositions SCC show a very long shelf life, and the pre-crosslinked compositions, formed by means of moisture are, in this form, storable and transportable and, in particular, have a predominantly plastic consistency. Thus, such compositions are ideal for the formation of modules, in which the composition has been applied to a substrate, and then, in the presence of moisture, a pre-crosslinked composition that adheres to the substrate is obtained. Such modules can be easily stored and transported to the place where the bonding is carried out and, where needed, can be heated and turned into a composite body. It is particularly advantageous here that proper adhesion can be achieved, despite what is sometimes a long interval between application of the composition and bonding. Furthermore, it is advantageous that this composition is not necessarily cured in two stages, but that it can also be activated before or during the application of heat, and can then be cured by means of moisture, like a normal single-component polyurethane adhesive.

In this way, it is possible, in a way that is simple, to obtain compositions that, when cured, show a high level of elasticity and high strength, that is, they have a breaking elongation of 300%, and a tensile strength of at least 3.0 MPa, both measured in accordance with DIN EN 53504. Such materials are particularly well suited for use as elastic adhesives.

Other aspects of the invention are the subject of further independent claims. Particularly favoured embodiments of the invention are the subject of the dependent claims.

WAYS OF IMPLEMENTING THE INVENTION

The invention is a single-component composition SCC which is curable in two stages, whereby, in the first curing by means of moisture, a composition showing pre-crosslinked properties arises and, in the second stage, which occurs by means of heat, a cured composition is produced.

In particular, the pre-crosslinked composition shows predominantly plastic properties. The cured composition shows mainly elastic properties.

"Single-component" as used in the present document refers to a curable composition, in which all the mixed constituents of the composition are stored in the same containers, and which is stable in storage, at room temperature, over a period of several weeks to months, and thus is either not, or is only marginally, changed by being stored, and is curable using moisture.

"Pre-crosslinked" as used in the present document refers to a composition showing marked increase in average molecular weight of the crosslinkable components, due to crosslinking reactions, without, however, the composition being fully crosslinked. Thus a pre-crosslinked composition contains further reactive groups that are capable of crosslinking.

The term "cured" as used in the present document refers to a composition which is substantially fully crosslinked. A cured composition contains no, or only small amounts of, reactive groups that are able to crosslink.

"Predominantly plastic properties" as used in the present document refers to a material having consistency such that it can be permanently deformed, in particular spread, with a spatula, if necessary using greater force and, if necessary, by heating to a temperature below 60° C.

Showing "predominantly elastic properties" as used in the present document refers to a material having consistency whereby it can not, possibly under the effect of greater force, be permanently deformed by means of a spatula, at a temperature of between 20° C. to 140° C., but, rather, within a few seconds to a few minutes, it essentially returns to its original form. Such material preferably shows a high level of elasticity and/or a high level of strength.

A "high level of elasticity" as used in the present document refers to a breaking elongation of at least 300%, preferably at least 400%, more preferably at least 450%, measured in accordance with DIN EN 53504. "High level of strength" is here meant tensile strength of at least 3.0 MPa, preferably at least 4.0 MPa, particularly 4.5 MPa, as measured in accordance with DIN EN 53504.

The term "room temperature" as used in the present document refers to a temperature of 25° C.

The term "primary amino group" as used in the present document refers to an amino group in the form of an NH2 group bound to an organic moiety. The term "secondary amino group" refers to an amino group wherein the nitrogen atom is bound to two organic moieties which may also together be part of a ring. The term "tertiary amino group" refers to an amino group wherein the nitrogen atom (=tertiary amino nitrogen) is bound to three organic moieties wherein two of these moieties may also together be part of a ring.

Names of chemicals bearing the prefix "poly", such as polyaldimine, polyamine, polyol or polyisocyanate, in this document, are substances which formally contain two or more of the functional groups, appearing in their names, per molecule.

The term "polymer" in this document includes, on the one hand, a group of chemically homogeneous macromolecules, but with the latter differing in terms of the degree of polymerization, molar mass and chain length, which were produced by a polymerization reaction (polymerization, polyaddition, polycondensation). The term also comprises derivatives of such a group of macromolecules obtained through polymerization, ie compounds obtained by reactions such as additions or substitutions of functional groups on existing macromolecules, for example, and which may or may not be chemically uniform. The term further also denotes so-called prepolymers, that is, reactive oligomeric pre-adducts, the functional groups of which are involved in the synthesis of macromolecules.

The term "polyurethane polymer" comprises all polymers manufactured according to the so-called diisocyanate polyaddition process. This term also includes those polymers that are nearly or completely free from urethane groups. Examples of polyurethane polymers are polyether poly-urethanes, polyester polyurethanes, polyether polyureas, polyureas, polyester polyureas, polyisocyanurates and polycarbodiimides.

A "low-odor" substance is defined as a substance having an odor which is perceptible to, that is, smellable, by human individuals only to a slight extent, said substance consequently not having an intensive odor, whereby this slight odor is not considered to be unpleasant or repellent by most humans.

An "odor-free" substance is defined as a substance which cannot be smelled by most human individuals and consequently has no perceptible odor.

The single-component, two-stage, curable composition preferably represents a single-component composition SCC comprising
   a) at least one isocyanate polyurethane polymer (PUP);
   b) at least one blocked amine (BA), with at least two blocked amino groups that can be activated by hydrolysis; and
   c) at least one surface-deactivated polyisocyanate (DI), that is solid at room temperature.

This is subject to the proviso that there is a stoichiometric excess of blocked, hydrolytically activatable amino-groups present in relation to the number of isocyanate groups of the polyurethane polymer (PUP).

The abbreviations in bold, such as, PUP, BA, or DI or suchlike, in this document, merely serve for better comprehension and identification.

With the curing of the single-component composition SCC, in the first curing stage, a pre-crosslinked composition with, in particular, predominantly plastic properties, arises in the presence of moisture, and a cured composition with, in particular, predominantly elastic properties, is obtained in the second stage of curing, which is induced by means of heat.

The single-component composition SCC preferably comprises at least one polyurethane polymer containing isocyanate group (PUP); In particular, the polyurethane polymer PUP can be obtained by reacting at least one polyol with at least one polyisocyanate. This reaction can be carried out in that the polyol and the polyisocyanate are reacted with commonly used methods, for example at temperatures of 50° C. to 100° C., optionally with simultaneous use of suitable catalysts, whereby the polyisocyanate can be metered in such a way that its isocyanate groups are present in stoichiometric excess relative to the hydroxyl groups of the polyol. The polyisocyanate can be advantageously metered in such a way that an NCO/OH ratio of 1.3 to 5, in particular, 1.5 to 3, is maintained. The "NCO/OH ratio" means the ratio of the number of isocyanate groups used to the number of hydroxyl groups used. Preferably, after the reaction of all hydroxyl groups of the polyol a content of free isocyanate groups of 0.5 to 15% by weight, especially preferred of 0.5 to 5% by weight, can remain in the polyurethane polymer PUP.

Optionally, the polyurethane polymer PUP can be produced with simultaneous use of softeners, provided that the used softeners do not contain any groups that are reactive relative to isocyanates.

As polyol for the production of the polyurethane polymer PUP, e.g., the following commercially available polyols or mixtures thereof can be used:
   Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms such as, for example, water, ammonia or compounds with several OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds. Both polyoxyalkylene polyols with a low degree of unsaturation (measured according to ASTM D-2849-69 and indicated in milliequivalents of unsaturation per gram of polyol (mEq/g)) and being produced, for example, using so-called double-metal cyanide complex catalysts (DMC catalysts) as well as polyoxyalkylene polyols having a higher degree of unsaturation and being produced, for example, using anionic catalysts, such as NaOH, KOH, CsOH or alkali alcoholates, can be used.

Especially preferred are polyoxyalkylene diols or polyoxyalkylene triols, in particular polyoxyethylene and polyoxypropylene dials and triols.

Polyoxyalkylene diols and trials with a degree of unsaturation that is less than 0.02 mEq/g and with a molecular weight in the range of 1,000-30,000 g/mol, as well as polyoxypropylene diols and trials with a molecular weight of 400-8,000 g/mol are especially suitable.

So-called ethylene oxide-terminated ("EO-endcapped," ethylene oxide-endcapped) polyoxypropylene polyols are suitable as well. The latter are special polyoxypropylene polyoxyethylene polyols which can be obtained, for example, in that pure polyoxypropylene polyols, in particular polyoxypropylene dials and -triols, after the polypropoxylation reaction with ethylene oxide is concluded, are further alkoxylated and as a result have primary hydroxyl groups.

Styrene-acrylonitrile or acrylonitrile-methylmethacrylate-grafted polyether polyols.

Polyester polyols, also called oligoesterols, produced according to known methods, in particular the polycondensation of hydroxycarboxylic acids or the polycondensation of aliphatic and/or aromatic polycarboxylic acids with dihydric or polyhydric alcohols.

Especially suitable as polyester polyols are those that are produced from dihydric to trihydric, for example, dihydric, alcohols, such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), hydroxypivalic acid neopentyl glycol ester, glycerol, 1,1,1-trimethylolpropane or mixtures of the above-mentioned alcohols with organic di- or tricarboxylic acids, in particular dicarboxylic acids, or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid and trimellitic acid anhydride or mixtures of the above-mentioned acids, as well as polyester polyols made of lactones, such as, for example, ε-caprolactone and starters such as the above-mentioned divalent or trivalent alcohols.

Especially suitable polyester polyols are polyester diols.

Polycarbonate polyols available by reacting, for example, the above-mentioned alcohols used for the formation of polyester polyols with dialkyl carbonates, diaryl carbonates or phosgene.

Block copolymers carrying at least two hydroxyl-groups that have at least two different blocks with polyether, polyester and/or polycarbonate structures of the above-described type, in particular polyether-polyester polyols.

Polyacrylate and polymethacrylate polyols.

Polyhydroxy-functional fats and oils, for example natural fats and oils, in particular castor oil; or polyols—so-called oleochemical polyols—obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical cross-linking, for example by reesterification or dimerization of the thus obtained degradation products or derivatives thereof. Suitable degradation products of natural fats and oils are in particular fatty acids and fatty alcohols as well as fatty acid esters, for example, the methyl esters (FAME) that can be derivatized, for example, by hydroformylation and hydrogenation to form hydroxy fatty acid esters.

Polyhydrocarbon polyols, also called oligohydrocarbonols, such as, for example, polyhydroxy-functional polyolefins, polyisobutylenes, polyisoprenes; polyhydroxy-functional ethylene-propylene-, ethylene-butylene- or ethylene-propylene-diene copolymers, as they are produced by, for example, the company Kraton Polymers; polyhydroxy-functional polymers of dienes, for example, of 1,3-butadiene, which can be produced, for example, also by anionic polymerization; polyhydroxy-functional copolymers that include dienes, such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers, as they can be produced from, for example, epoxides or amino alcohols and carboxyl-terminated acrylonitrile/butadiene copolymers (for example commercially available under the names Hypro® (previously Hycar®) CTBN and CTBNX and ETBN of Nanoresins AG, or Emerald Performance Materials LLC); as well as hydrogenated polyhydroxy-functional polymers or copolymers of dienes.

Preferably, these above-mentioned polyols have a mean molecular weight of 250 to 30,000 g/mol, in particular of 400-20,000 g/mol, and preferably they have a mean OH-functionality in the range of from 1.6 to 3.

Preferred polyols are polyether, polyester, polycarbonate and polyacrylate polyols, preferably diols and triols.

Especially preferred are polyether polyols, in particular polyoxypropylene and polyoxypropylene-polyoxyethylene polyols, as well as liquid polyester polyols and polyether-polyester polyols.

Moreover, amorphous, partially crystalline and crystalline polyester and polycarbonate diols with a melting point in the range of from 40° C. to 80° C., in particular 50° C. to 70° C., in particular adipic acid/hexanediol polyesters, azelaic acid/hexanediol polyesters, dodecanedicarboxylic acid/hexanediol polyesters and polycarbonate diols on the basis of hexanediol, are especially preferred.

In addition to these mentioned polyols, small amounts of low-molecular, dihydric or polyhydric alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as saccharose, other polyhydric alcohols, low-molecular alkoxylating products of the above-mentioned dihydric and polyhydric alcohols as well as mixtures of the above-mentioned alcohols can be used simultaneously in the production of the polyurethane polymer PUP. Also, small amounts of polyols with a mean OH functionality of more than 3, for example sugar polyols, can be used simultaneously.

Aromatic or aliphatic polyisocyanates, in particular diisocyanates, are used as polyisocyanates for the manufacture of a polyurethane polymer PUP having isocyanate groups.

In particular, monomeric di- or triisocyanates such as 2,4- and 2,6-toluylene diisocyanate and any mixture of these isomers (TDI), 4,4'-, 2,4'- and 2,2'-diphenylmethane diisocyanate and any mixture of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthaline-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane, tris(4-isocyanatophenyl) thiophosphate, oligomers and polymers of the above-mentioned isocyanates and any mixture of the above-mentioned isocyanates are suitable as aromatic polyisocyanates. MDI and TDI are preferred.

Especially suitable aliphatic polyisocyanates are in particular monomeric di- or triisocyanates such as 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and any mixture of these isomers (HTDI or $H_6TDI$), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}MDI$), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimeric and trimeric fatty acid isocyanates, such as 3,6-bis-(9-isocyanatononyl)-4,5-di-(1-heptenyl)cyclohexene (dimeryl diisocyanate), α,α,α',α',α",α"-hexamethyl-1,3,5-mesitylene triisocyanate, oligomers and polymers of the above-mentioned isocyanates, as well as any mixture of the above-mentioned isocyanates. HDI and IPDI are preferred.

Aromatic or aliphatic polyisocyanates, especially MDI, are particularly favoured as polyisocyanates for producing a polyurethane polymer PUP containing isocyanate groups.

Preferably, the polyurethane polymer PUP has a mean molecular weight of 500 g/mol or more. In particular, the polyurethane polymer PUP has a mean molecular weight of from 1000 to 30,000 g/mol, preferably from 2000 to 10,000 g/mol. Moreover, the polyurethane polymer PUP preferably has a mean NCO functionality in the range of from 1.7 to 3, in particular from 1.8 to 2.5.

The single-component composition SCC preferably additionally comprises, together with at least one polyurethane polymer PUP, furthermore at least one blocked amine BA with at least two blocked amino groups that have been activated by hydrolysis.

The blocked, hydrolyically activated amino groups of the blocked amine BA are, in particular, selected from the group comprising oxazolidine groups and aldimino groups. Such blocked amines BA are substances known in polyurethane chemistry, that are used as so-called latent curing agents in compositions containing isocyanate groups.

By "oxazolidine groups" is here meant both tetrahydro-oxazole groups (5-ring) and tetrahydro-oxazine groups (6-ring).

Polyaldminies PA of the formula (I) are preferred as blocked amines BA,

   (I)

where
n=2 or 3 or 4, preferably 2 or 3;
A is an n-valent hydrocarbon moiety having from 2 to 30 carbon atoms, which optionally contains at least one heteroatom, particularly in the form of ether oxygen or tertiary amine nitrogen; and
Z is free of hydroxyl, mercapto, primary and secondary amino groups, and is either a moiety $Z^1$, having the formula (II),

   (II)

where
Y is a monovalent hydrocarbon moiety having 1 to 32 carbon atoms, which optionally has at least one heteroatom, particularly oxygen or nitrogen in the form of ether-, carbonyl-, ester-, amido-, urea, urethane or tertiary amino groups, and
$R^1$ and $R^2$ are either
independently of one another, each a monovalent hydrocarbon moiety having 1 to 12 carbon atoms,
or together represent a divalent hydrocarbon moiety having 4 to 12 carbon atoms, which is part, where applicable, of an optionally substituted carbocyclic ring, having 5 to 8, preferably 6, carbon atoms, or a moiety $Z^2$,
where $Z^2$ is either a substituted or unsubstituted aryl or heteroaryl radical, which has a ring size of 5 to 8, preferably 6, atoms,
or stands for

where $R^0$ represents a hydrogen atom or an alkoxy moiety or a substituted, or unsubstituted, alkenyl or arylalkenyl moiety with at least 6 carbon atoms.

The dashed lines in the formulas in this document each represent the bond between a substituent and the associated molecular radical.

The polyaldimine PA of formula (I) has aldimino groups that have no hydrogen atom on the carbon atom in the α-position and, therefore cannot tautomerize to form enamino-groups. Thus, these aldimino-groups are particularly well-protected ("blocked") primary amino groups, which, in the absence of moisture, show no, or extremely low, isocyanate reactivity. This makes these aldimines, together with compounds containing isocyanate-groups, particularly storable.

A preferably contains no hydroxyl-, mercapto- and no primary or secondary amino-groups.

Z is preferably $Z^1$.

$R^1$ and $R^2$ are preferably each a methyl moiety.

$Z^1$ is preferably a moiety of the formula (IIa) or (IIb) or (IIc) or (IId),

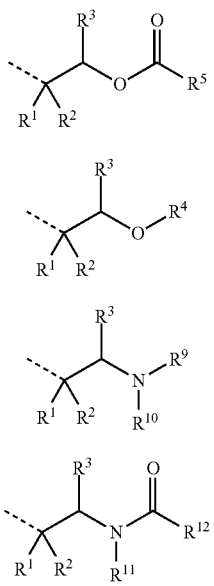

where:
$R^3$ is a hydrogen atom, an alkyl group, a cycloalkyl group, or an arylalkyl group, having 1 to 12 carbon atoms;
$R^4$ is a hydrocarbon moiety having 1 to 30 carbon atoms, which, where applicable, contains ether-oxygen;
$R^5$ is either a hydrogen atom,
  or a linear or branched alkyl radical, having 1 to 30 carbon atoms, where applicable with cyclic components and possibly with at least one heteroatom, particularly oxygen in the form of ether, carbonyl or ester groups,
  or represents a mono- or polyunsaturated, linear or branched hydrocarbon radical, having 5 to 30 carbon atoms,
  or, if necessary, is a substituted aromatic or heteroaromatic 5- or 6-member ring;
$R^9$ and $R^{10}$ are, independently of each other, either a monovalent aliphatic, cycloaliphatic or arylaliphatic radical, with 1 to 20 carbon atoms, where applicable, containing heteroatoms in the form of ether oxygen or tertiary amine nitrogen,
  or they are, together, a divalent, aliphatic radical, having 3 to 20 carbon atoms, which, where applicable, is part of a substituted heterocyclic ring having 5 to 8, preferably 6, ring atoms and, where applicable, containing other heteroatoms in the form of ether oxygen or tertiary amine-nitrogen, adjacent to the nitrogen atom; and
$R^{11}$ and $R^{12}$ are, together, either a divalent moiety with 2 to 10 C-atoms, where applicable containing oxygen or sulphur atoms, that is part, where applicable of a substituted, 5-, 6- or 7-member ring,
or
  $R^{11}$ is an alkyl, cycloalkyl, arylalkyl or acyl moiety with 1 to 10 carbon atoms, and
  $R^{12}$ is a hydrogen atom or a monovalent radical, having 1 to 20 carbon atoms, which is selected from the group consisting of alkyl, cycloalkyl, arylalkyl, aryl radical, $OR^{12'}$, $SR^{12'}$ and $NO^{12'}R^{12''}$,
    where $R^{12'}$ and $R^{12''}$ are either, in each case, a hydrocarbon radical, or together represent an alkylene, which is part of a 5-, 6-, or 7-membered ring.

$R^3$ is preferably a hydrogen atom.

$R^4$ is preferably a hydrocarbon radical, having 6 to 30 carbon atoms, particularly 11 to 30 carbon atoms, which, where applicable, contains ether-oxygen.

Preferably, $R^5$ is preferably a linear or branched alkyl moiety with 6 to 30, especially 11 to 30, carbon atoms, possibly with cyclic components and possibly with at least one heteroatom, or, for a mono- or polyunsaturated, linear or branched hydrocarbon radical, with 6 to 30, especially 11 to 30, carbon atoms.

$R^9$ and $R^{10}$ are preferably, independently of each other, in each case, methyl, ethyl, propyl, isopropyl, butyl, isobutyl, 2-ethylhexyl, cyclohexyl or benzyl, or together form, with the involvement of the nitrogen atom, a ring, especially a pyrrolidine, piperidine, morpholine or N-alkylpiperazine-ring, whereby this ring may be substituted.

$R^{11}$ is preferable a methyl, ethyl, propyl, isopropyl, butyl, 2-ethylhexyl, cyclohexyl or benzyl moiety and $R^{12}$ is a hydrogen atom or a methyl, ethyl, propyl, isopropyl, butyl, 2-ethylhexyl, cyclohexyl, benzyl, methoxy, ethoxy, propoxy or isopropoxy radical, or $R^{11}$ and $R^{12}$ together form, with the inclusion of the nitrogen atom and the carbonyl or thiocarbonyl group, a ring, especially a 2-pyrrolidone ring, a pyrrolidine-2,5-dione-ring, a piperidine-2-one ring, a piperidine-2,6-dione-ring, an azepane-2-one-ring, an oxazolidine-2-one-ring or a thiazolidine-2-one ring, wherein such a ring may be substituted.

$Z^1$ is most preferably a moiety of the formula (II a'),

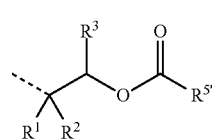

where:
$R^{5'}$ is either:
  a linear or branched alkyl radical, having 6 to 30, particularly 11 to 30, C-atoms, where applicable with cyclic components and possibly with at least one heteroatom, particularly oxygen in the form of ether, carbonyl or ester groups,
  or represents a mono- or polyunsaturated, linear or branched hydrocarbon moiety with 6 to 30, particularly 11 to 30 carbon atoms,
and $R^1$, $R^2$ and $R^3$ are as previously mentioned.

$R^{5'}$ is most preferably a $C_{11}$-alkyl radical.

Polyaldimines PA, in which Z is a moiety $Z^1$ having the formula (II a'), are hereinafter the polyaldimine PA1, having formula (III)

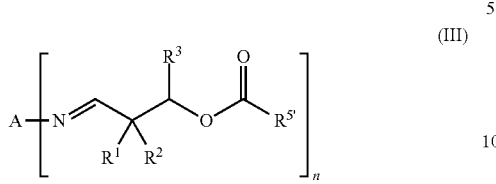

(III)

where n, A, $R^1$, $R^2$, $R^3$ and $R^{5'}$ are as stated above.

The polyaldimines PA1, with the formula (III), have the advantage that they are low-odor or odor-free, and that their releasable aldehyde is likewise low-odor or odor-free. Where the moiety $R^{5'}$ has at least 11 carbon atoms, the resulting polyaldimines are odorless, and the aldehyde that can be released from it is also odorless.

A polyaldimine PA, with the formula (I), can be obtained from the condensation reaction of at least one amine B, having the formula (IV), with at least one aldehyde ALD, having the formula (V).

where n, A and Z are as stated above.

The following are particularly suitable for use as amine B:

aliphatic, cycloaliphatic or aryl aliphatic diamines such as ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecane diamine, 1,2-, 1,3- and 1,4-diaminocyclohexane, bis-(4-aminocyclohexyl)-methane ($H_{12}$-MDA), bis-(4-amino-3-methylcyclohexyl)-methane, bis-(4-amino-3-ethylcyclohexyl)methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA) 3(4),8(9)-bis(aminomethyl)-tricyclo[5.2.1.0$^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]undecane, and 1,3- and 1,4-xylylene diamine;

Aliphatic diamines containing ether groups, for example bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, bis-(3-aminopropyl)polytetrahydrofurans and other polytetrahydrofuran diamines with molecular weights of up to 550 g/mol, and polyoxyalkylene diamines with a molecular weight of up to 600 g/mol. The latter are typically products from the amination of polyoxyalkylene diols, and can, for example, be obtained under the trade mark Jeffamine® (from Huntsman), under the name of Polyetheramin (from BASF) or under the trade mark PC Amine® (from Nitroil). Particularly suitable polyoxyalkylene-diamines include Jeffamine® D-230, Jeffamine® D-400, Jeffamine® ED-600, Jeffamine® XTJ-568, Jeffamine® XTJ-569, Jeffamine® EDR-104, Jeffamine® EDR-148, Jeffamine® EDR-176; polyetheramine D 230 and polyetheramine D 400, PC Amine® DA 250 and PC Amine® DA 400;

aliphatic, cycloaliphatic or aryl aliphatic triamines such as 4-aminomethyl-1,8-octane diamine, 1,3,5-tris-(aminomethyl)benzene, 1,3,5-tris-(aminomethyl)cyclohexane, tris-(2-aminoethyl)amine, tris-(2-aminopropyl)amine, tris-(3-aminopropyl)amine;

Polyoxyalkylene triamines, having a molecular weight up to 600/mol, which are typically products of the amination of polyoxyalkylene triols, for example, and are available under the trade name Jeffamine® (from Huntsman), under the name of Polyetheramin (from BASF) or under the trade name PC Amine® (from Nitroil), in common with, for example, Jeffamine® T-403, polyether amine T403 and PC Amine® TA 403;

Aromatic di- and triamines, such as 1,2-, 1,3- and 1,4-phenylenediamine, 2,4- and 2,6-toluene diamine (TDA), 3,4-toluene diamine, 3,5-dimethylthio 2,4- and 2,6-toluene diamine, 3,5-diethyl-2,4- and -2,6-tolylenediamine (DETDA), 2,4,6-triethyl-1,3-phenylenediamine, 2,4,6-triisopropyl-1,3-phenylenediamine, 3-ethyl-5-methyl-2,4-toluene diamine, 3,5-diisopropyl-2,4-toluene diamine, 3,5-bis-(1-methylpropyl)-2,4-toluenediamine, 3,5-bis-(tert-butyl)-2,4-toluene diamine, 3-ethyl-5-isopropyl-2,4-toluene diamine, 5-isopropyl-2,4-toluene diamine, 5-(tert-butyl)-2,4-toluene diamine, 4,6-bis-(1-methylpropyl)-1,3-phenylenediamine, 4-isopropyl-6-(tert-butyl)-1,3-phenylenediamine), 4-ethyl-6-isopropyl-1,3-phenylenediamine, 4-ethyl-6-(2-methylpropyl)-1,3-phenylenediamine, 4-ethyl-6-(1-methylpropyl)-1,3-phenylenediamine, 4-ethyl-6-(2-methylpropyl)-1,3-phenylenediamine, 4-isopropyl-6-(1-methylpropyl)-1,3-phenylenediamine, 4-(tert-butyl)-6-(2-methylpropyl)-1,3-phenylenediamine, 4-cyclopentyl-6-ethyl-1,3-phenylenediamine, 4-cyclopentyl-6-isopropyl-1,3-phenylenediamine, 4,6-dicyclopentyl-1,3-phenylendiamine, 3-isopropyl-2,6-toluene diamine, 2-methylpropyl-(4-chloro-3,5-diaminobenzoate), tert-butyl-(4-chloro-3,5-diaminobenzoat), 2,6-diaminopyridine, melamine, 4,4-, 2,4'- and 2,2'-diaminodiphenylmethane (MDA), 3,3'-dimethyl-4,4'-diaminodiphenylmethane, 3,3'-Dichloro-4,4'-diaminodiphenylmethane (MOCA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5-dimethyl-4,4'-diaminodiphenylmethane (M-MIPA), 3,3',5,5'-tetraisopropyl-4,4'-diaminodiphenylmethane (M-DIPA), 3,3',5,5'-tetra-(1-methylpropyl)-4,4'-diaminodiphenylmethane, 3,3'-dimethyl-5,5'-di-tert-butyl-4,4'-diaminodiphenylmethane, 3,3'-di-tert-butyl-4,4'-diaminodiphenylmethane, 4,4'-diaminodiphenyl sulfone (DDS), 4-amino-N-(4-aminophenyl)benzenesulfonamide, 5,5'-methyl dianthranilic acid, dimethyl-(5,5'-methyl(di)anthranilate), 1,3-propylene-bis-(4-aminobenzoate), 1,4-butylene-bis-(4-aminobenzoate), polytetramethylene-oxide-bis-(4-aminobenzoate) (available as Versalink® from Air Products) and 1,2-bis-(2-aminophenylthio) ethane;

Polyamines with primary aromatic and aliphatic primary amino groups, especially 4-aminoethylaniline, 4-aminomethylaniline, 4[(4-aminocyclohexypmethyl] aniline, 2-aminoethylaniline, [(4-aminocyclohexyl)methyl]aniline and 4-[(2-aminocyclohexyl)methyl]-aniline.

The amine B is preferably selected from the group comprising 1,6-hexamethylenediamine, MPMD, DAMP, IPDA, TMD, 1,3-xylylene diamine, 1,3-bis-(aminomethyl)cyclohexane, bis-(4-aminocyclohexyl)methane, bis-(4-amino-3-methylcyclohexyl)methane, 3(4),8(9)-bis-(aminomethyl)-tricyclo[5.2.1.0$^{2.6}$]decane, 1,2-, 1,3- and 1,4-diaminocyclohexane, 1,4-diamino-2,2,6-trimethylcylohexane, 3,6-dioxaoctane-1,8-diamine, 4,7-dioxadecane-1,10-diamine, 4-aminomethyl-1,8-octane diamine, polyoxyalkylene polyamines having two or three amino groups and a molecular weight up to 600 g/mol, in particular, the types D-230, D-400 and T-403 available under the trade name Jeffamine®, from Huntsman, and analogous compounds from BASF or Nitroil; 1,3- and 1,4-phenylenediamine, 2,4- and 2,6-toluene diamine, 4,4'-2,4'- and 2,2'-diaminodiphenylmethane, 3,3'-dichloro-4,4'-diaminodiphenylmethane and mixtures of the above polyamines.

As amine B, polyoxyalkylene polyamines, having two or three amino groups and a molecular weight up to 600 g/mol, in particular types D-230, D-400 and T-403, available, from Huntsman, under the trade name Jeffamine®, and analogous compounds from BASF or Nitroil, and mixtures of such polyamines, especially mixtures of difunctional to trifunctional types, are particularly favoured.

The aldehydes ALD of formula (V) are not enolizable. Aldimines with aldimino groups, originating from a non-enolizable aldehyde, cannot form enamino groups, and therefore represent particularly well-blocked amines.

In a preferred form of implementation, the aldehyde ALD has a moiety $Z^1$ having formula (II a). Such aldehydes are esters of aliphatic, cycloaliphatic or arylaliphatic 2,2-disubstituted 3-hydroxy aldehydes, such as, for example, 2,2-dimethyl-3-hydroxypropanal, 2-hydroxymethyl-2-methyl-butanal, 2-hydroxymethyl-2-ethyl-butanol, 2-hydroxymethyl-2-methyl-pentanal, 2-hydroxymethyl-2-ethyl-hexanal, 1-hydroxymethyl cyclopentanecarboxaldehyde, 1-hydroxymethyl-cyclohexanecarbaldehyde 1-hydroxymethyl-cyclohex-3-encarboxaldehyde, 2-hydroxymethyl-2-methyl-3-phenyl-propanal, 3-hydroxy-2-methyl-2-phenyl-propanal represents and 3-hydroxy-2,2-diphenyl-propanal, with appropriate carboxylic acids, the following, for example, being suitable as carboxylic acids: saturated aliphatic carboxylic acids such as formic, acetic, propionic, butyric, isobutyric, valeric, caproic, 2-ethylcaproic, enanthic, caprylic, and pelargonic acid, capric acid, undecanoic acid, lauric acid, tridecanoic, myristic, pentadecanoic, palmitic, margaric and stearic acid, nonadecanoic acid, arachidic acid; mono-unsaturated aliphatic carboxylic acids such as palmitoleic, oleic acid, erucic acid; poly-unsaturated aliphatic carboxylic acids such as linoleic acid, linolenic acid, elaeostearic and arachidonic acid; cycloaliphatic carboxylic acids such as cyclohexane carboxylic acid; arylaliphatic carboxylic acids such as phenylacetic acid; aromatic carboxylic acids such as benzoic acid, naphthoic acid, toluic acid, and anisic acid; isomers of these acids; fatty acid mixtures from the technical saponification of natural oils and fats such as canola oil, sunflower oil, linseed oil, olive oil, coconut oil, oil palm kernel oil and palm oil; and dicarboxylic acid alkyl and aryl esters, as obtained from the simple esterification of dicarboxylic acids such as succinic acid, glutaric, adipic, pimelic, suberic, azelaic and sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and similar derivatives of polyethylene glycol, with alcohols such as methanol, ethanol, propanol, butanol, and higher homologues and isomers of these alcohols. Carboxylic acids with at least 7 carbon atoms, especially those with 12 to 31 carbon atoms, especially lauric acid, myristic acid, palmitic acid, stearic acid and oleic acid, are preferred. Lauric acid is particularly preferred.

In a further preferred embodiment, the aldehyde ALD has a moiety $Z^1$ having formula (II b). Such aldehydes are ethers of aliphatic, cycloaliphatic or arylaliphatic 2,2-disubstituted 3-hydroxy aldehydes with alcohols, or phenols, of the formula $R^4$—OH. Preferred aldehydes ALD, in the form of such ethers, are 2,2-dimethyl-3-phenoxy propanal, 3-cyclohexyloxy-2,2-dimethyl-propanal, 2,2-dimethyl-3-(2-ethylhexyloxy)-propanal, 2,2-dimethyl lauroxy-3-propanal and 2,2-dimethyl-3-stearoxypropanal.

In a further preferred embodiment, the aldehyde ALD has a moiety $Z^1$ having formula (II c). Such aldehydes are, in particular, available as the product of α-amino alkylation, which is analogous to the Mannich reaction, as known from the relevant literature; such an aldehyde can therefore be referred to as a Mannich base. Here, a secondary aldehyde, isobutyraldehyde in particular, another aldehyde, especially formaldehyde, and a secondary aliphatic amine are converted into an aldehyde ALD, in connection with the elimination of water. Particularly suitable aldehydes ALD, in the form of such a Mannich base, are 2,2-dimethyl-3-(N-morpholino)-propanal, 2,2-dimethyl-3-(N-(2,6-dimethyl) morpholino)-propanal, 2,2-dimethyl-3-(N-benzylmethylamino)-propanal, 2,2-dimethyl-3-(N-benzylisopropylamino)-propanal and 2,2-dimethyl-3-(N-cyclohexylmethylamino)-propanal.

In a further preferred embodiment, the aldehyde ALD has a moiety $Z^1$ having formula (II d). Such aldehydes are obtained, in particular, as a product of a Mannich reaction—in the same way as the aldehyde ALD with a moiety $Z^1$, having the formula (II c), whereby, instead of a secondary aliphatic amine, an amide, lactam, carbamate or imide is used. Particularly suitable aldehydes ALD with a moiety $Z^1$, having the formula (II d) are N-(2,2-dimethyl-3-oxopropyl)-N-methylacetamide, N-(2,2-dimethyl-3-oxopropyl)-N-butylacetamide, N-(2,2-dimethyl-3-oxopropyl)-N-(2-ethylhexyl)acetamide, N-(2,2-dimethyl-3-oxopropyl)-N-benzylacetamide, N-(2,2-dimethyl-3-oxopropyl)-N-methylbutyramide, N-(2,2-dimethyl-3-oxopropyl)-N-methyl-(2-ethylcapronamide), N-(2,2-dimethyl-3-oxopropyl)-N-methylbenzamide, O-ethyl-N-(2,2-dimethyl-3-oxopropyl)-N-methylcarbamate, N-(2,2-dimethyl-3-oxopropyl)-pyrrolidine-2-one, N-(2,2-dimethyl-3-oxopropyl)-piperidine-2-one, N-(2,2-dimethyl-3-oxopropyl)-azepane-2-one, N-(2,2-dimethyl-3-oxopropyl)-oxazolidine-2-one, N-(2,2-dimethyl-3-oxopropyl)-pyrrolidine-2,5-dione and N-(2,2-dimethyl-3-oxopropyl)-phthalimide.

In a further preferred embodiment, the aldehyde ALD has a moiety $Z^2$. Such aldehydes ALD include, for example, aromatic aldehydes such as benzaldehyde, 2- and 3- and 4-tolualdehyde, 4-ethyl- and 4-propyl- and 4-isopropyl and 4-butyl-benzaldehyde, 2,4-dimethylbenzaldehyde, 2,4,5-trimethylbenzaldehyde, 4-acetoxybenzaldehyde, 4-anisaldehyde, 4-ethoxybenzaldehyde, the isomeric di- and trialkoxybenzaldehydes, 2-, 3- and 4-nitrobenzaldehyde, 2- and 3- and 4-formyl pyridine, 2-furfuraldehyde, 2-thiophenecarbaldehyde, 1- and 2-naphthylaldehyde, 3- and 4-phenoxybenzaldehyde, quinoline-2-carbaldehyde and its position 3-, 4-, 5-, 6-, 7- and 8-isomers, and also anthracene-9-carbaldehyde; furthermore, also glyoxal, glyoxylic acid esters such as, for example, glyoxylic acid methyl ester, cinnamaldehyde and substituted cinnamaldehydes.

As aldehydes ALD having the formula (V), 2,2-dimethyl-3-lauroyloxypropanal, 2,2-dimethyl-3-myristoyloxy-propanal, 2,2-dimethyl-3-palmitoyloxy-propanal, 2,2-dimethyl-3 stearoyloxy-propanal and 2,2-dimethyl-3-oleyloxy-propanal are preferred.

As aldehyde ALD of the formula (V), 2,2-dimethyl-3-lauroyloxy propanal is the most favoured.

The blocked amine BA is present in the single-component composition SCC to an extent whereby the blocked, hydrolytically activatable amino-groups is present as a stoichiometric excess, in relation to the number of isocyanate groups of the polyurethane polymer (PUP).

Advantageously, the blocked amine BA in the single-component composition SCC is present to an extent whereby the ratio of blocked, hydrolytically activatable amino groups to the number of isocyanate groups of the polyurethane polymer PUP is 1.05 to 2.0, preferably 1.1 to 1.75, more preferably 1.2 to 1.5.

The single-component composition SCC preferably comprises, in addition, at least one polyurethane polymer PUP and at least one blocked amine BA and, furthermore, at least one surface-deactivated polyisocyanates DI, that is solid at room temperature.

The surface-deactivated polyisocyanate DI is preferably present in fine-particle form, with "fine" here referring to a substance having an average particle-diameter of less than 120 µm.

More preferably, the average particle-diameter of the surface-deactivated polyisocyanate DI lies in the range of 0.01 to 100 µm, preferably 0.1 to 50 µm, especially from 0.3 to 30 µm.

Surface-deactivated polyisocyanates, which are solid at room temperature, are known from the State of the Art, from EP 0 062 780 A1, EP 0 100 508 A2 and EP 0153 579 A2, for example.

The surface-polyisocyanate DI is based on a polyisocyanate, which is solid at room-temperature, whose melting point lies significantly above room-temperature. Advantageously, the polyisocyanate that is solid at room temperature has a melting point of at least 40° C., preferably at least 80° C., more preferably at least 120° C.

In particular, the polyisocyanate that is solid at room temperature is selected from the group comprising naphthalene-1,5-diisocyanate (NDI), 3,3'-dimethyl-4,4'-diisocyanatodiphenyl (TODD, 1,4-phenylene diisocyanate, isocyanurate of 1-isocyanato-3,3,5-trimethyl-5-isocyanatomethyl cyclohexane, uretdione of 4,4'-diphenylmethane diisocyanate, uretdione of 2,4-toluenediisocyanate and the urea of 2,4-toluene diisocyanate. Naphthalene-1,5-diisocyanate (NDI), uretdione of 2,4-toluene diisocyanate and urea of 2,4-toluene diisocyanate, are particularly preferred.

The polyisocyanate that is solid at room temperature is preferably based on fine particles, with an average particle-diameter in the range of 0.01 to 100 µm, preferably 0.1 to 50 µm, particularly 0.3 to 30 µm.

Addolink® TT (from Rhein Chemie) is an example of a commercially available, fine-particle uretdione of 2.4-TDI.

The surface-deactivated polyisocyanate DI consists of particles of polyisocyanate that are solid at room temperature, the surfaces of which are covered with a varying thickness of a substance that is sufficiently impermeable and stable at room temperature to enclose the isocyanate groups inside the particles, and thus to make them inaccessible to chemical reaction partners, particular to compounds with active hydrogen atoms, hence "deactivating" them. When heating the surface-deactivated polyisocyanate DI to a temperature of at least 60° C., preferably at least 80° C., the layer on the polyisocyanate particles is damaged to such an extent that the isocyanate groups, within the particles, become accessible to chemical reactants, and hence are "activated".

The surface-deactivated polyisocyanate DI is obtained, in particular, from the conversion, of the polyisocyanate on which it is based and which is solid at room temperature, by means of a substance having at least one group that is able to react with isocyanate groups. Through a chemical reaction on the surface of the polyisocyanate particles, a layer ("protective layer") is formed that is resistant, i.e. impermeable and largely insoluble, at room, or slightly raised, temperature. A suitable substance for this reaction, referred to as "a surface-deactivation substance" is, in particular, selected from the group comprising water, primary and secondary aliphatic amines, amino amides, hydrazines, hydrazides, phenols, carboxylic acids, amidines and guanidines.

In choosing the surface-deactivation substance, it is important that the protective layer formed will be as resistant as possible with regard to all the substances present in the composition, particularly to the ketones and aldehydes used to produce the blocked amine BA, in order to prevent the isocyanate groups of the surface-deactivated polyisocyanate DI from being activated prematurely.

Primary and secondary amines, particularly primary polyamines, and especially the primary amines stated as being amines B, having formula (IV), and also fatty amines, polyalkyleneamines, polyamidoamines, and carboxylic acid salts of these amines are preferred as the substance used for surface-deactivation. The protective layer formed with these substances here contains urea groups.

The fatty amines referred to here are amines derived from fatty acids and mixtures of them, such as, for example, lauryl amine, myristyl amine, palmitin amine, stearylamine, oleylamine, cocoalkylamine, $C_{16}$-$C_{22}$-alkylamine, soy alkylamine, oleylamine, and tallow alkylamine, for example available under the trade names Armeen® (from Akzo Nobel) or Rofamin® (from Ecogreen Oleochemicals), and, further, diamine obtainable through cyanoethylation and subsequent reduction of fatty amines such as N-cocoalkyl-1,3-propanediamine, N-oleyl-1,3-propanediamine, N-soyalkyl-1,3-propanediamine, N-tallow alkyl-1,3-propanediamine, or N—($C_{16-22}$-alkyl)-1,3-propanediamine, available, for example as Duomeen® CD, Duomeen® M, Duomeen® 0, Duomeen® OV or Duomeen® T (from Akzo Nobel), and also triamines and tetramines, derived from fatty amines, such as, for example, cocoalkyl dipropylene triamine, oleyl dipropylene triamine, tallow alkyl dipropylene triamine, oleyl tripropylene tetramine and tallow tripropylene tetramine, available, for example, as Triameen® C, Triameen® OV, Triameen® T, Tetrameen® OV and Tetrameen® T (from Akzo Nobel).

The polyalkyleneamines are here oligomer ethylene amines with partial secondary amino groups, which, in particular, are present as technical mixtures, such as diethylenetriamine (DETA), triethylenetetramine (TETA), tetraethylenepentamine (TEPA), and pentaethylenehexamine (PENA) for example.

The polyamidoamines here are substances with at least one amido- and at least one amino group, in particular the reaction products of a mono- or polyvalent carboxylic acid or, as the case may be, their esters or anhydrides, and an aliphatic, cycloaliphatic or aromatic polyamine, whereby a stoichiometric excess of the polyamine is used. A so-called dimer fatty acid is normally used as polyvalent carboxylic acid, and a polyalkylene amine, such as diethylenetriamine (DETA) or triethylenetetramine (TETA), is usually used as a polyamine. Commercially available polyamidoamines include Versamid® 100, 125, 140 and 150 (from Cognis), Aradur® 223, 250 and 848 (from Huntsman), Euretek® 505, 510, 514 S, 530, 531, 540, 541, 545, 547, 549, and 3607 (from Huntsman) and Beckopox® EH 651, EH 654, EH 655, EH 661 and EH 663 (from Cytec).

As surface deactivation agents, the following, in particular, are favoured: short chain aliphatic primary diamines, especially ethylenediamine, 1,2-propanediamine, 1,3-propanediamine, 1,4-butane and 1,6-hexanediamine; cycloaliphatic primary diamines, particularly bis-(4-aminocyclohexyl)-methane, bis-(4-amino-3-methylcyclohexyl)-methane and 1-amino-3-aminomethyl-3,5,5-trimethylcyclohexane; fatty amines, in particular, stearylamine and oleylamine; polyalkyleneamines, especially diethylenetriamine, triethylenetetramine and tetraethylenepentamine; and also polyamidoamines, particularly from dimer fatty acids and diethylenetriamine or triethylenetetramine.

Concerning the surface-deactivated polyisocyanate DI, the uretdione of 2,4-TDI, which is surface-deactivated using a polyamidoamine, is particularly favoured. single-component compositions SCC that are particularly stable in storage are obtained in this way.

For conversion with the solid polyisocyanate, the substance used for surface deactivation is preferably used to an extent whereby, for 100 isocyanate groups, 0.5 to 20, preferably 1 to 15, and more particularly 3 to 12, groups that are reactive with regard to isocyanate groups are present.

The conversion, of the polyisocyanate that is solid at room temperature, with the substance used for the surface-deactivation, is carried out at a temperature below the melting point of the polyisocyanate that is solid at room temperature, and preferably at a temperature below 50° C., whereby the polyisocyanate is dispersed in a liquid medium in which the layer formed on the surface of the polyisocyanate particles is largely insoluble at this temperature. Suitable liquid media are, in particular, plasticizers, especially carboxylic acid esters such as phthalates, in particular dioctyl phthalate, diisononyl phthalate or diisodecyl phthalate, adipates, especially dioctyl adipate, azelates and sebacates, organic phosphoric and sulphonic acid esters or polybutenes. Polyols, as previously mentioned in connection with the production of a polyurethane polymer PUP, and what are known as capped polyols, that is polyols, the hydroxyl groups of which have been converted into esters or, in particular, ether groups, for example, are also largely suitable as a liquid medium. Polyurethane polymers, particularly polyurethane polymers PUP, the isocyanate groups of which are converted with monofunctional alcohols, thiols or primary or secondary amines, and, furthermore, polymers that are liquid at room temperature, which are largely free of isocyanate groups or groups that react to isocyanate groups, are, further, also suitable as liquid media.

It is possible to treat the polyisocyanate, which is solid at room temperature, and on which the surface-deactivated polyisocyanate DI is based, before the surface deactivation, with a second polyisocyanate that is liquid at room temperature, such that this second polyisocyanate wets or coats the surface of the polyisocyanate that is solid at room temperature, and to only then carry out the surface deactivation with the substance that is used for this. In this way, the surface deactivating layer of the second polyisocyanate, which is liquid at room temperature, is formed.

The surface-deactivated polyisocyanate DI is preferably present in the single-component composition SCC to an extent whereby the ratio of, what with regard to the polyurethane polymer PUP are excessively blocked, hydrolytically activatable amino groups of the blocked amine BA, to the isocyanate groups of the surface-deactivated polyisocyanate DI, is 0.25 to 1, preferably 0.3 to 0.8.

The single-component composition SCC can contain further constituents, in addition to at least one polyurethane polymer PUP, at least one blocked amine BA and at least one surface-deactivated polyisocyanate DI.

In particular, they may contain a material that increases the thermal conductivity of the composition and/or enables, due to its piezoelectric, ferromagnetic or superparamagnetic properties, the heating of the composition through the application of magnetic and/or alternating electric fields, in particular through microwaves or induction. This allows the composition, which generally has a limited thermal conductivity, to heat faster and thus accelerates curing. The substances that are suitable for such use are particularly graphite, conductive carbon black and metal powders; piezoelectric substances such as quartz, tourmaline, barium titanate, lithium sulphate, potassium (sodium) tartrate, ethylenediamine and lead zirconium titanate; ferromagnets or super paramagnetic substances such as the metals aluminium, cobalt, iron, nickel and their alloys, metal oxides of the n-maghemite ($\gamma Fe_2O_3$) type, N-magnetite ($Fe_3O_4$), and ferrites of the general formula $MFe_2O_4$, where M stands for divalent metals from the group copper, zinc, cobalt, nickel, magnesium, calcium or cadmium. This material is preferably in fine particle form, whereby the average particle diameter is less than 120 μm, particularly 50 μm. For the utilization of the superparamagnetic effect, the average particle diameter is preferably less than 30 nm.

To utilize the superparamagnetic effect, the average particle diameter is preferably less than 50 nm, especially less than 30 nm.

As further constituents, the single-component composition SCC can contain the auxiliary and additional agents commonly used in polyurethane compositions, such as the following for example:

Plasticizers, especially carboxylic acid esters such as phthalates, in particular dioctyl phthalate, di-isononyl phthalate or diisodecyl phthalate, adipates, especially dioctyl adipates, sebacates and azelates, and organic phosphorus and sulphonic acid ester or polybutene;

non-reactive thermoplastic polymers such as homo- or copolymers of unsaturated monomers, particularly those from the group consisting of ethylene, propylene, butylene, isobutylene, acrylates, isoprene, vinyl acetate and alkyl(meth)acrylate, especially polyethylene (PE), polypropylene (PP), polyisobutylene, ethylene-vinyl acetate copolymers (EVA) and atactic poly-α-olefins (APAO);

solvents;

inorganic and organic fillers, in particular ground or precipitated calcium carbonates, which may, where applicable, be coated with fatty acids, particularly stearates, also barite ($BaSO_4$, also called heavy spar), quartz, calcined kaolin, aluminum oxides, aluminum hydroxides, silicic acid, especially highly disperse silicic acids from pyrolysis processes, carbon blacks, especially industrially produced carbon blacks (hereinafter referred to as "carbon black"), PVC powder, or hollow spheres;
fibres such as polyethylene ones;
pigments such as titanium dioxide or iron oxides;
catalysts, which accelerate the hydrolysis of aldimino groups, especially acids, in particular organic carboxylic acids such as benzoic acid, salicylic acid or 2-nitrobenzoic acid, organic carboxylic acid anhydrides such as phthalic anhydride, hexahydrophthalic anhydride and hexahydromethyl phthalic anhydride, silyl esters of organic carboxylic acids, organic sulfonic acids such as methanesulfonic acid, p-toluenesulfonic acid or 4-dodecylbenzenesulpfonic acid, sulfonic acid ester, other organic or inorganic acids, or mixtures of these acids and acid esters;
Catalysts which accelerate the reaction of the isocyanate groups, especially organotin compounds such as dibutyltin diacetate, dibutyltin dilaurate, dibutyltin dichloride, dibutyltin diacetyl acetonate and dioctyltin dilaurate, bismuth compounds such as bismuth trioctoate and bismuth tri(neodecanoate), and compounds containing tertiary amino-groups such as 2,2'-dimorpholinodiethyl and 1,4-diazabicyclo[2.2.2]octane;
rheology modifiers, particularly thickeners or thixotropic agents, for example, urea compounds, polyamide waxes, bentonites and pyrogenic silicas;
drying agents, such as molecular sieves, calcium oxide, highly reactive isocyanates such as p-tosyl isocyanate, monomeric diisocyanates, orthoformates, alkoxysilanes such as tetraethoxysilane, organoalkoxysilanes such as vinyl trimethoxysilane, and organoalkoxysilanes which, in relation to the silane group, have a functional group in the α-position;
adhesion promoters, especially organoalkoxysilanes ("silanes") such as epoxy silanes, vinyl silanes, (meth)acryloylsilanes, isocyanatosilanes, carbamatosilanes, alkyl silanes, S-(alkylcarbonyl)-mercaptosilanes and aldiminosilanes, and oligomeric forms of these silanes;
stabilizers against heat, light and UV radiation;
flame retardants;
surface-active substances, especially wetting agents, leveling agents, aerating agents or defoamers;
biocides such as algaecides, fungicides or fungal growth-inhibiting substances.

It is advantageous to pay attention to the use of other components of the composition, so that these do not greatly affect the storage-stability of the composition. This means in particular that they should not contain water or, at most, should contain traces of it. It may be useful to chemically or physically dry certain ingredients before mixing them into the composition.

The single-component composition SCC preferably contains at least one catalyst. The catalyst is, in particular, a metal compound and/or a compound containing tertiary amino-groups and/or one of the above acids such as benzoic acid or salicylic acid.

The single-component composition SCC preferably further contains at least one filler.

The single-component composition SCC is stable when stored at room temperature, that is, it can be stored in suitable packaging or in an appropriate structure, such as a drum, a bucket, a bag, cartridge or a bottle, over a period of several months, without being changed in its application properties or in its features, after curing to an extent relevant to its use. Typically, stability in storage is determined by measuring viscosity or the extrusion force.

The single-component composition SCC is preferably used such that it cures in two stages, whereby, in the first curing stage, a pre-crosslinked composition PCC having mainly plastic properties, is formed, with this composition being stable in storage under appropriate conditions; the second curing stage results in a cured composition AZ, having mainly elastic properties.

In the first curing stage, the single-component composition SCC comes into contact with moisture. The isocyanate groups of the polyurethane polymer PUP and, where applicable, further isocyanate groups that are present in the composition, hereinafter referred to as "accessible" isocyanate groups, react on contact with the hydrolyzing, blocked amino groups BA. The isocyanate groups of the surface-deactivated polyisocyanates DI do not, however, respond insofar as they have not been activated. A ketone or, in particular, an aldehyde is released from the reaction of hydrolyzing blocked amino-groups with isocyanate groups. The reaction of the hydrolyzing, blocked amino-groups with isocyanate groups does not have to occur by means of free amino groups, but reactions with intermediates of the hydrolysis are also possible. Thus, a hydrolyzing aldimino group can, for example, react with an isocyanate group in the form of a hemiaminal group. The blocked amino groups, which are present in excess in relation to the accessible isocyanate groups, remain as such or as, at least partially, hydrolyzed, blocked amino-groups.

The temperature in the first curing stage is preferably below 50° C., especially somewhere between room temperature and 40° C.

In the second curing stage, the temperature ranges lies particularly within the range from 60° C. to 160° C., preferably from 80° C. to 140° C., more preferably from 90° C. to 130° C.

The moisture, which is needed to hydrolyze the blocked amino-groups, can either come from the air (humidity), or the composition can be brought into contact with constituents that contain water, by say brushing with smoothing agent for example, or, during application, a constituent containing water, can be added to the composition, particularly in the form of a water-containing paste, which is, for example, mixed in using a static mixer.

The moisture concerned is preferably present in the form of air humidity or water mixed into the composition, particularly in the form of a paste containing water.

Air humidity is particularly preferable as the source moisture.

As stated above, the single-component composition SCC forms a pre-crosslinked composition PCC in the first curing stage.

Another object of the present invention is therefore a pre-crosslinked composition VZ, comprising:
a') at least one polymeric, blocked amine PBA with at least two blocked, hydrolytically activatable amino groups, which is obtained from the reaction of at least one isocyanate-group containing polyurethane polymer PUP, with at least one blocked amine BA and moisture;
c) at least one surface-deactivated polyisocyanate DI that is solid at room temperature, and
d) moisture.

The moisture comes either from the air, and is therefore in the form of humidity in the pre-crosslinked composition VZ, especially diffused in during the formation from the single-component composition SCC, and/or it comes from a constituent, which contains water, which has been mixed into the single-component composition SCC on which the pre-crosslinked composition PCC is based.

In order to cure the pre-crosslinked composition PCC by means of heat, the presence of moisture is necessary so that the blocked amino groups, present in the pre-crosslinked composition, react with the activated isocyanate groups of the surface-deactivated polyisocyanate DI. Particularly fast curing of the precured composition is achieved where the pre-crosslinked composition PCC already contains the necessary moisture for the hydrolysis of the blocked amino groups.

So long as the surface-deactivated polyisocyanate DI remains in the surface-deactivated state, that is, it is not activated, the pre-crosslinked composition PCC is stable when stored. It is particularly stable in storage as long as it is kept at a temperature below 50° C., especially from room temperature to 40° C. The pre-crosslinked composition PCG shows, in particular, predominantly plastic properties. The term "plastic properties" here also includes thermoplastic properties. Depending on the type of substances present in the pre-crosslinked composition PCC, it may be soft at room temperature, having, especially, a soft-pasty consistency, or it may have a sticky viscous-plastic to solid, thermoplastic consistency with a surface that is only slightly sticky.

In order to obtain a pre-crosslinked composition PCC with a highly viscous-plastic to solid, thermoplastic consistency and a slightly sticky surface, it can be advantageous if the composition contains a material which is solid at room temperature and which melts not far above room temperature, for example in the temperature range 40 to 80° C. This can, in particular, be a polyurethane polymer PUP, for which a polyol, which is at least partially solid at room temperature, especially a polyester or polycarbonate, with a melting point ranging from, for example 40 to 80° C., particularly 50 to 70° C. was used to produce it.

The pre-crosslinked composition PCC preferably contains, at the moment when it is heated for further curing, moisture to at least a stoichiometric extent in relation to the number of isocyanate groups of the surface-deactivated polyisocyanate DI.

For further hardening of the pre-crosslinked, or precured, composition PCC, the latter is, in a second curing stage, heated to a suitable temperature, giving rise to a cured composition CC, showing mainly elastic properties. This process is hereinafter also referred to as "subsequent crosslinking".

Upon heating the pre-crosslinked composition PCC to a temperature ranging from 60 to 160° C., preferably from 80 to 140° C., and especially from 90 to 130° C., the protective layer of the surface-deactivated polyisocyanate DI is damaged to an extent whereby its isocyanate groups are activated, thereby becoming accessible to the hydrolyzed and hydrolyzing blocked amino-groups present in the pre-crosslinked composition PCC; these amino groups react with the isocyanate groups in the same way as described for the first curing stage, and the isocyanate groups that are present to an excess extent, in relation to these blocked amino groups react directly with moisture. The damage to the protective layer of the surface-deactivated polyisocyanate DI is irreversible; the activation of the isocyanate groups remains effective even after a possible cooling of the composition. The subsequent crosslinking also occurs completely, even if the pre-crosslinked composition PCC is only heated for a short period of time. Opening of the 2,4-TDI uretdione ring, with the release of further isocyanate groups, was not observed up to a temperature of 130° C.

The moisture required for the hydrolysis of the blocked amino moisture is either already fully present in the composition, for example, because it has penetrated the pre-crosslinked composition PCC in the form of humidity in the pre-crosslinked composition PCC from the ambient air, or because it was added, in the form of water, to the single-component composition SCC, as previously described, supplied in the form of water, or it gradually penetrates the composition that has been activated by heat. If the moisture that is necessary for hydrolyzing all or the majority of the blocked amino groups is already present in the pre-crosslinked composition PCC, then the subsequent crosslinking occurs very rapidly on heating. If the quantity of moisture that is present is however insufficient for this, then the subsequent crosslinking occurs more slowly, and from the outside inwards, since some moisture must penetrate the composition for the full reaction of the blocked amino groups. As a result of these reactions result, the cured composition CC arises in the form of a solid material with, in particular, predominantly elastic properties.

The heat needed for subsequent crosslinking can be generated using any energy source. Suitable means for carrying out the heating here are circulating-air ovens, hot air blowers or infrared lamps. If at least one of the substrates, with which the composition is in contact, is ferromagnetic and/or the composition is a piezoelectric, ferromagnetic or superparamagnetic material, the heating can also occur by applying magnetic and/or alternating electric fields, in particular through the use of microwaves or induction; this allows particularly rapid heating of the compositions described.

The single-component composition SCC can basically be cured by other means than that of the two curing stages described.

Namely, the composition may be cured by heating it prior to its being applied, with it being applied only later, that is, brought into contact with moisture. The heating can be carried out at any time prior to application. By heating to a temperature ranging from 60 to 160° C., preferably from 80 to 140° C., and more preferably from 90 to 130° C., the surface-deactivated polyisocyanate DI is activated at an early stage and thus its isocyanate groups are thereby as accessible to the chemical reactants as the isocyanate groups of the polyurethane polymer PUP. By means of moisture, the composition that is pre-treated in this way cures after its application in one stage, whereby the cured composition arises directly from the cured composition CC. If the moisture that is needed for the curing comes from the air, the curing is effected from outside inwards.

The composition can also be cured by heating it, during or shortly after its application, to a temperature ranging from 60 to 160° C., preferably from 80 to 140° C., and more preferably from 90 to 130° C. Also with this procedure, the surface-deactivated polyisocyanate DI is activated at an early timepoint, and its isocyanate groups are thereby as accessible to chemical reactants as the isocyanate groups of the polyurethane polymer PUP. Therefore, the composition, depending on the heating time-point, cures, by means of moisture, after it has been applied, more or less directly into the cured composition CC. With this approach, the moisture that is needed for curing is preferably mixed into the composition, particularly in the form of a water-containing paste. Through the immediate availability of the water, the curing of the composition occurs very quickly on being heated.

The single-component composition SCC is characterized by a good level of stability in storage at room temperature, or slightly above it, that is, typically below 50° C., and is easy to apply. In a first curing stage, it cures, by means of moisture, to form a pre-crosslinked composition PCC, which is storable and transportable, at temperatures below 50° C., for some weeks or months. The pre-crosslinked composition PCC has a significantly higher viscosity than the underlying single-component composition SCC. Depending on the constituents contained in it, the pre-crosslinked composition PCC advantageously has a soft-pasty, highly viscous-plastic or solid consistency, and a clear, sticky, slightly sticky or unsticky surface. Such a pre-crosslinked composition PCC can be stored as a modular body, together with the substrate to which it has been applied, and then, only later, be placed in contact with a second substrate and cured by means of heat, with the bonding of the two substrates. In the case of such use, it is critical that the pre-crosslinked composition PCC, even after prolonged storage in its pre-crosslinking state, should show, with subsequent crosslinking, a good level of adhesion to the second substrate with which it is brought into contact at the time of the subsequent crosslinking.

If the pre-crosslinked composition PCC is heated as described, it hardens very quickly to form a material that is mainly elastic, and thereby tends not to form bubbles. Already, after a short time following heating, it shows such a high level of strength, that it can be handled or placed under loading, by being walked on, or by grinding, through transportation, or through the removal of fixing brackets. The cured composition CC shows, in particular, a high strength level, and high level of extension with predominantly elastic characteristics.

A further feature of the single-component composition SCC is the fact that it can, if this is wanted, be cured in a single stage, by heating it shortly after application. With this, the same cured composition CC, with the same mechanical properties as described in the two-stage curing, is formed.

There is an additional advantage in only using polyaldimines PA1 as a blocked amine BA. These particularly preferred single-component composition SCC are low-odor or odor-free before, during and after the first and second curing stages, and the aldehyde released during the curing largely remains in the pre-crosslinked composition PCC, and in the cured composition CC, whereby these scarcely show any shrinkage. Low-odor or odorless curing is a big advantage, if not a prerequisite, for many applications, especially indoors.

A single-component composition that can be cured in two stages, as described above, is suitable for use as an adhesive or sealant, particularly as an elastic adhesive for industrial applications, for example, in the assembly of vehicles such as cars, transportation vehicles and ships.

In particular, such a composition is suitable as an elastic adhesive for applications in which the adhesive is pre-applied to a substrate and pre-crosslinked using moisture, and the compound structure, comprising the substrate and pre-crosslinked adhesive, is stored and transported, before being placed in contact with another substrate and cured by exposure to heat. The pre-crosslinked adhesive can here be heated immediately before, during and/or soon after joining.

In the case of a substrate on which the adhesive is pre-coated and pre-crosslinked using moisture, the item concerned may, for example, be a component of a car, transport vehicle, ship or other industrial product. The application of the adhesive and the first curing stage to give a pre-crosslinked composition can here, in particular, take place on the manufacturer's premises. The component, complete with the precured composition, can subsequently be delivered to the car, transport vehicle, or other product, manufacturer, or the shipbuilder, where it is quickly and easily joined, by adhesion, to other components, by heating the pre-crosslinked composition, with the latter curing to form a material with, in particular, predominantly elastic properties. This approach makes it unnecessary, for the manufacturer of the industrial product, to apply the adhesive to the component itself, thereby saving time and expense in connection with the joining process.

If the single-component composition is used as an adhesive, for elastic adhesion, in the automotive industry, it preferably has a pasty consistency, with shear thinning properties. Such an adhesive is applied to the substrate, using a suitable device, preferably in the form of a bead which preferably has a substantially round or triangular cross-sectional face. Suitable methods for applying the adhesive are, for example, application from commercial cartridges, which are operated manually or by means of compressed air, or from a drum or pail using a pump or an extruder, where applicable, by means of an application robot. An adhesive with good application properties shows high stability and short stringing. That is, it remains in the form in which it is applied, after application, and produces a short thread, or no thread at all, after the withdrawal of the application device, such that the substrate is not soiled.

Elastic bonding in vehicle construction includes, for example, the sticking of parts, such as plastic covers, trims, flanges, bumpers, driver's cabs or other attachments, to the painted body, or the adhesion of screens into the body. Vehicles concerned here include cars, trucks, buses, trains and ships.

Another aspect of the present invention relates to a process for bonding a substrate S1 with a substrate S2, comprising the following steps:
  i) Application of a single-component composition to a substrate S1 and bringing the composition into contact with moisture at a temperature below 50° C., so that a pre-crosslinked composition is formed;
  ii) Heating the pre-crosslinked composition, by means of a suitable method, to a temperature in the range of 60 to 160° C., preferably from 80 to 140° C., and more preferably from 90 to 130° C.;
  iii) Bringing the pre-crosslinked, that is, pre-cured, composition into contact with a substrate S2;
    whereby steps ii) and iii) can also occur simultaneously or in reverse order, and
    whereby the substrate S2 is made of the same or from different material as substrate S1.

The following are here particularly suitable materials as substrates S1 and/or S2
  Glass, ceramic material, concrete, mortar, brick, red-brick, plaster and natural stone such as granite or marble;
  Metals or alloys such as aluminum, steel, iron, non-ferrous metals, and galvanized metals;
  Leather, textiles, paper, wood, resin-bonded wood materials, resin-fabric composite materials and other so-called polymer composites;
  Plastics such as polyvinyl chloride (rigid and flexible PVC), acrylonitrile-butadiene-styrene (ABS), SMC (sheet moulding compounds), polycarbonate (PC), polyamide (PA), polyester, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), whereby the plastics can favourably be surface-treated by means of plasma, a corona or a flame;
  coated substrates such as powder-coated metals or alloys; and paints and varnishes.

The substrates can, if necessary, be pretreated before application of the composition. Such pretreatments include, in particular physical and/or chemical cleaning methods such as grinding, sanding, brushing, or suchlike, or treatment with detergents or solvents, or the application of an adhesion promoter, adhesion promoter solution or a primer.

This method of bonding, described here, more specifically with the use of the described composition as an adhesive, gives rise to a product.

This product is, in particular, a building, especially a building construction or civil engineering, or an industrial or consumer item, particularly a window, a household appliance, or a means of transport, especially a water vessel or land vehicle, preferably a car, bus, truck, train or a ship, or a vehicle component, or a furniture, textile or packaging industry item.

Another aspect of the present invention relates to a module 2, comprising a substrate S1 11 and a pre-crosslinked composition 5', on it, obtained from a single-component composition SCC and the effect of moisture 9, as described in detail above. This modular body can form a composite by the action of heat and by being placed in contact with a second substrate. The pre-crosslinked composition is cured by the heat.

A further aspect of the present invention relates to a composite body 3, which comprises a substrate S1 11, a substrate S2 12, and a cured composition 5" located between substrate S1 and substrate S2, which was obtained from a single-component composition SCC, with exposure to moisture 9 and heat 8, as described in detail above. As previously described, there are different possibilities for the timepoint and the sequence of exposure of the composition to heat and to moisture. In particular, the effect of moisture in the form of humidity leads, following application of a previously described single-component composition 5 to a substrate S1 11 to a modular body 2, which then, under the influence of heat and by contact with a substrate S2 12, forms a composite body 3.

BRIEF DESCRIPTION OF DRAWINGS

The examples of implementation of the invention are described below in detail. The same elements are given the same reference numbers in the various diagrams.

These are as follows.

The drawings are diagrammatic representations. There are only shown for purposes of immediate comprehension of the essential elements of the invention.

Figure 1:
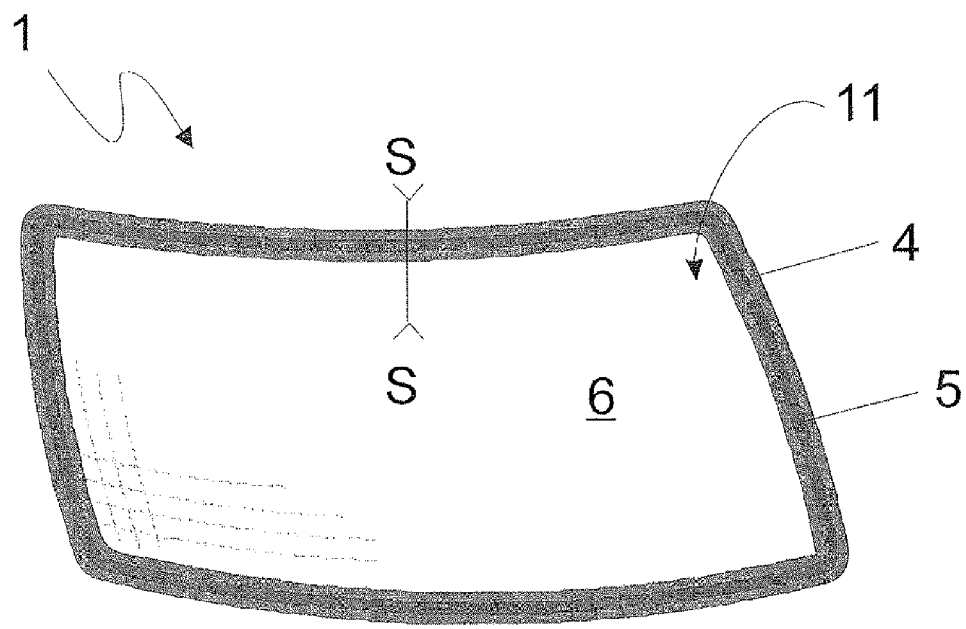
FIG. 1 a plan view of a car windscreen

FIG. 1 diagrammatically shows a car windscreen 1, which is composed of a glass panel 6, which is coated, on its outer edge, with a ceramic 4, whereupon a single-component composition 5, as described above, has been applied as an adhesive in the form of a triangular bead. The glass panel 6 with the ceramic 4, is the substrate S1 11.

Figure 2:
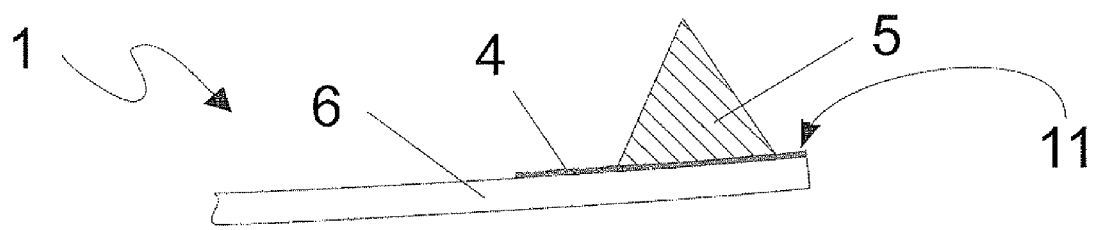
FIG. 2 a cross-sectional view through a windscreen in accordance with FIG. 1

FIG. 2 diagrammatically shows a cross-section through a portion of the windscreen 1 of FIG. 1, along the line S-S.

Under the influence of moisture, the single-component composition 5 gives rise to a pre-crosslinked composition 5'.

Figure 3:
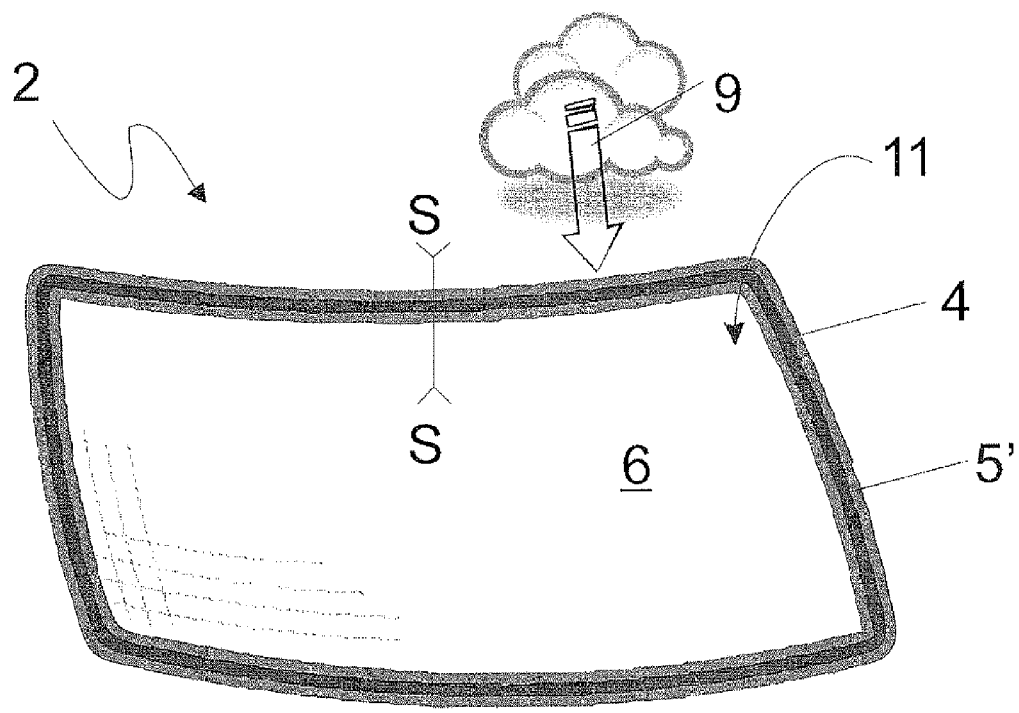
FIG. 3 a plan view of a modular body (windscreen with pre-crosslinked adhesive)

FIG. 3 diagrammatically shows such a modular body 2, comprising the substrate S1 11 and the pre-crosslinked composition 5' located on it.

Figure 4:
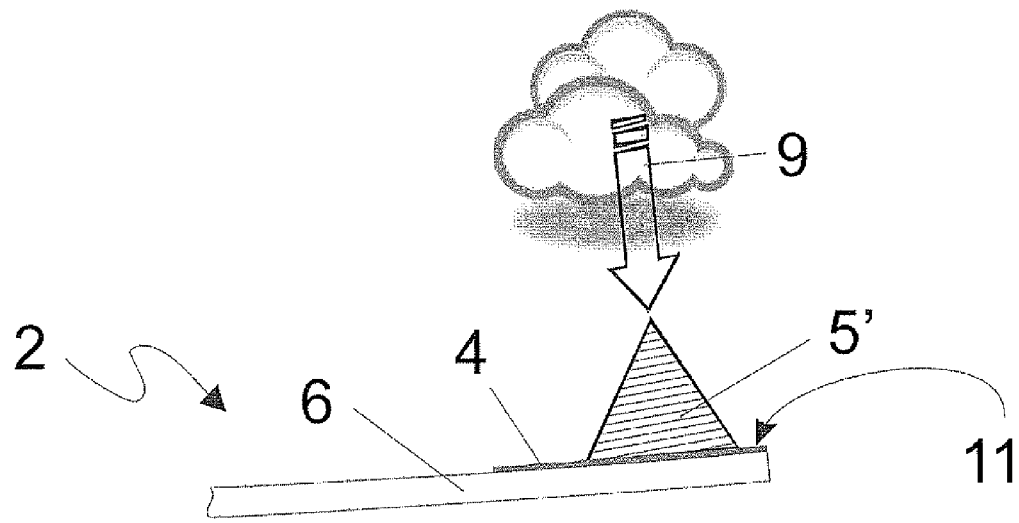
FIG. 4 a cross-sectional view through a modular body in accordance with FIG. 3

FIG. 4 diagrammatically shows a cross-section through a portion of the modular body 2 of FIG. 3, along the line S-S. This corresponds to the situation of FIG. 2, after exposure to moisture.

Figure 5:
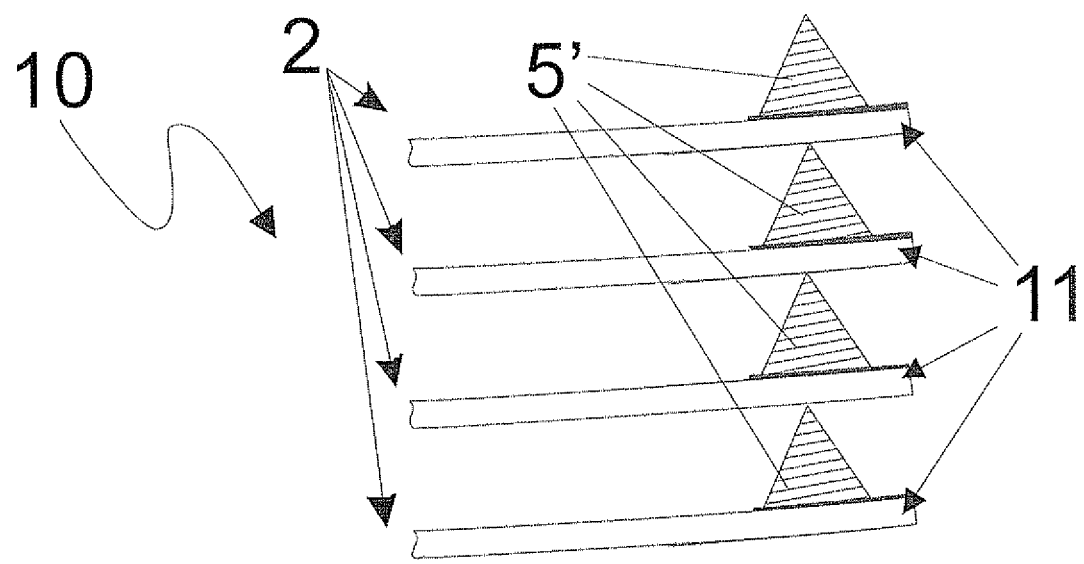
FIG. 5 a cross-sectional view through a modular body in accordance with FIG. 3 or FIG. 4

This modular body 2 can now be stored for a long time without its properties significantly changing. The pre-crosslinked composition 5' adheres to the substrate S1 11, i.e. glass ceramic element 4, or the glass panel 6 and, in particular, has a non-sticky surface. Furthermore, the pre-crosslinked composition 5' is, in particular, so storage-stable, that individual modules can be stacked one on top of another. FIG. 5 shows a cross-sectional view through such a pile 10 of modular bodies 2. The pre-crosslinked composition 5' serves as a spacer during stacking, so that the individual glass panes do not come into contact, and thereby scratch each other.

Figure 6:
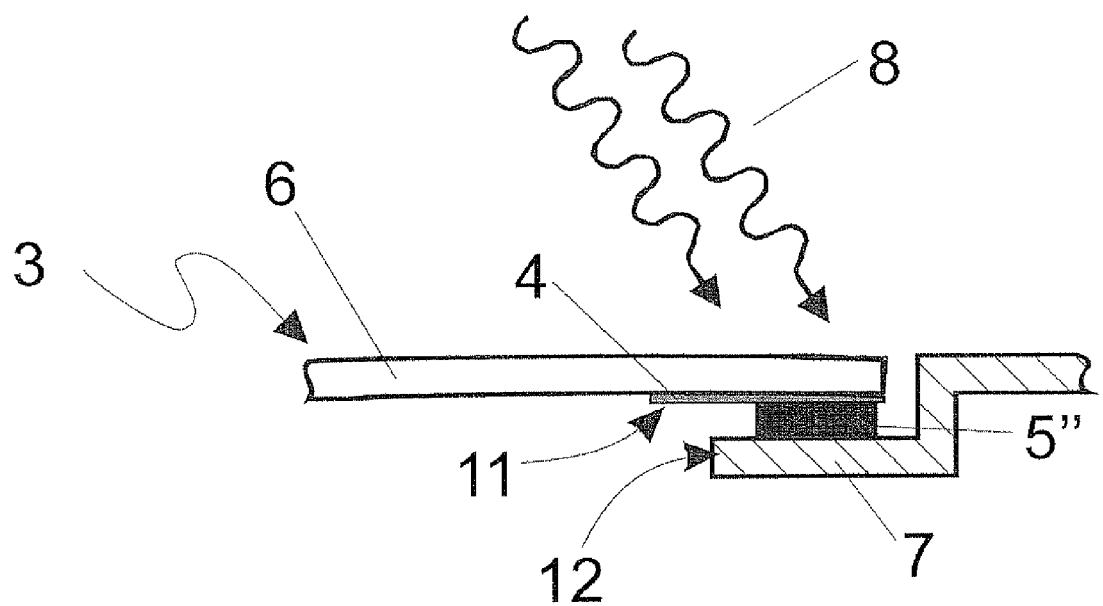
FIG. 6 a cross-sectional view through a composite body (built-in windscreen with cured adhesive)

The modular body 2 can be transported and reused as needed. In principle, any time period, especially a week to 2 months, can pass between the application of the single-component composition and the further use of the modular body 2. The modular body 2 can, for further use, be installed into a vehicle body. When assembling, the variant of the pre-crosslinked composition 5', shown in FIG. 6, was placed in contact with the flange of the vehicle body 7, then pressed and cured by exposure to heat 8, whereby the cured composition 5", the substrate S1 11 and the substrate S2 12 form a composite body 3.

Figure 7:
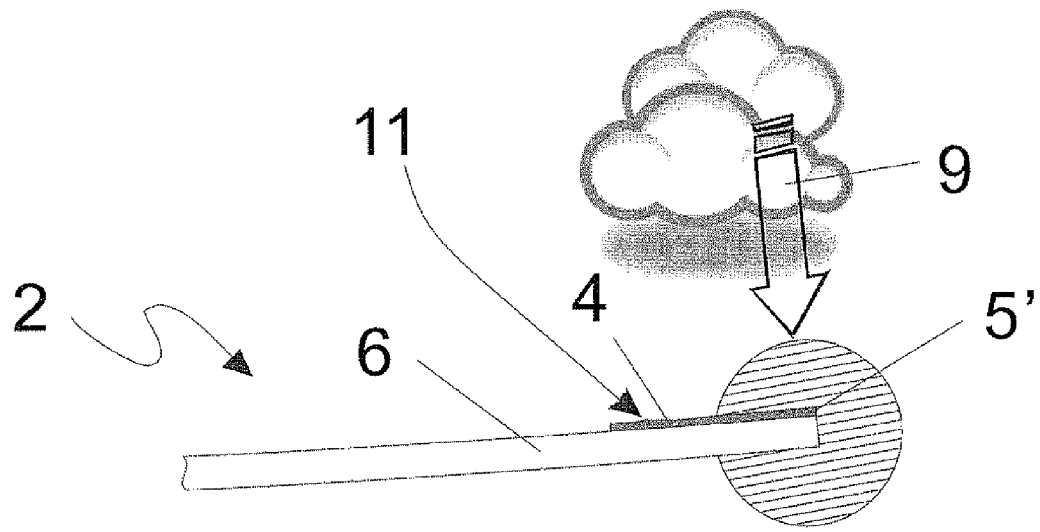
FIG. 7 a cross-sectional view through a modular body with sheathed edges

FIG. 7 diagrammatically shows a cross-section through a modular body 2 in the form of a windscreen, at the edge of which the pre-crosslinked composition 5' has, on being applied to the substrate S1, that is to the glass panel 6 or ceramic element 4, been put on as edge sheathing. This embodiment is particularly suitable for applications in which the panel is stuck on several sides, including the front edge, to a substrate, and/or in which the excess adhesive is used as a sealant for the joint between the windscreen and the vehicle body.

Figure 8:
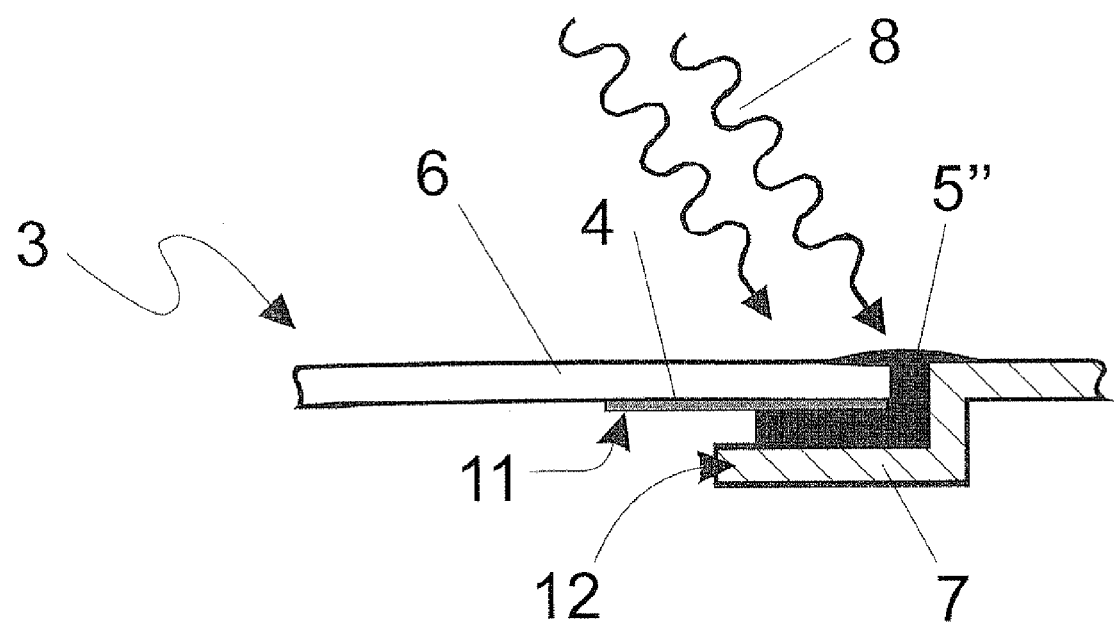
FIG. 8 a cross-sectional view through a composite body (built-in windscreen with cured adhesive)

This type of bonding is used, in particular, for "flush glazing", when a flush bond is wanted on a car windscreen, as shown in FIG. 8, in a cross-section. The pre-crosslinked composition 5' was here placed in contact with the flange of the vehicle body 7, pressed and cured by exposure to heat 8, whereby the cured composition 5", the substrate S1 11 and the substrate S2 12 form a composite body 3.

REFERENCE NUMBERS

| | |
|---|---|
| 1 | Windscreen with adhesive applied |
| 2 | Modular body |
| 3 | Composite body |
| 4 | Glass ceramics |
| 5 | Single-component composition |
| 5' | Pre-crosslinked composition |
| 5" | Cured composition |
| 6 | Glass panel |
| 7 | Vehicle body flange |
| 8 | Exposure to heat |
| 9 | Exposure to moisture |
| 10 | Pile of modular bodies 2 |
| 11 | Substrate S1 |
| 12 | Substrate S2 |

EXAMPLES

By "normal air conditions" is here meant a temperature of 23±1° C. and a relative humidity of 50±5%. "RT" means room temperature.

1. Description of the Measurement Methods

The amine content, that is, the total content of blocked (aldimino group) and free amino groups in the compounds prepared, was determined by titration (with 0.1N $HClO_4$ in glacial acetic acid, with crystal violet) and is always expressed in mmol N/g.

2. Production of Blocked Amines

Aldimine A-1

625 g of 2,2-dimethyl-3-lauroyloxypropanal was put in a round-bottom flask under a nitrogen atmosphere. With vigorous stirring, 334.2 g polyethertriamine (Jeffamine® T-403, Huntsman, amine content 6.29 mmol N/g) was slowly added from a dropping funnel. Then the volatiles were removed under a vacuum (10 mbar, 80° C.). Yield: 921 g of clear, pale yellow liquid with an amine content of 2.28 mmol N/g.

Aldimine A-2

743 g of 2,2-dimethyl-3-lauroyloxypropanal was provided, in a round-bottom flask, under a nitrogen atmosphere. With vigorous stirring, 300 g polyether diamine (Jeffamine® D-230, Huntsman; amine content 8.29 mmol N/g) was slowly added from a dropping funnel. Then the volatiles were removed under a vacuum (10 mbar, 80° C.). Yield: 995 g of clear, pale yellow liquid with an amine content of 2.53 mmol N/g.

3. Production of the Polyurethane Polymer

Polymer P-1

400 g of polyoxypropylene diol (Acclaim® 4200 N, Bayer; OH-value: 28.5 mg KOH/g) and 52 g of 4,4'-methylene diphenyl diisocyanate (4,4'-MDI, Desmodur 44 MC L, Bayer) were converted by a known method at 80° C. to form an NCO-terminated polyurethane polymer with a content of free isocyanate groups of 1.90% by weight.

4. Preparation of the Surface-Deactivated Polyisocyanate

Isocyanate Paste DI-1

40 g of fine-particle dimeric 2,4-toluene diisocyanate (Addolink® TT, Rhein Chemie), particle size approx. 5-50 µm, was dispersed in a dispersion device. 6.6 g of polyamidoamine (Euretek® 531, from Huntsman-amine value: 195 mg KOH/g) was added to this and the mixture processed by re-dispersing to form a fine paste.

5. Preparation of Single-Component, Two-Stage Curable Adhesives

Adhesive K-1 and Adhesive K-2

The components of the adhesives K-1 and K-2 were worked into a lump-free, uniform paste, in a vacuum mixer, in accordance with the weight proportions shown in table 1; then this was, in each case, immediately filled into an internally coated aluminum cartridge and the cartridge was made airtight.

TABLE 1

Composition of the adhesives K-1 and K-2.

|  | Adhesive K-1 | Adhesive K-2 |
| --- | --- | --- |
| Polymer P-1 | 33.0 | 33.0 |
| Aldimine A-1 | 1.0 | 2.0 |
| Aldimine A-2 | 7.0 | 6.0 |
| Palatinol ® Z | 18.0 | 18.0 |
| hydrophobic, pyrogenic silica | 3.0 | 3.0 |
| carbon black | 13.0 | 13.0 |
| kaolin | 18.0 | 18.0 |
| salicylic acid[a] | 2.0 | 2.0 |
| isocyanate paste DI-1 | 5.0 | 5.0 |

[a] 5 wt-% in dioctyl adipate.

The storability of the adhesives K-1 and K-2 was indirectly characterized by determining the viscosity, measured as extrusion pressure, of the adhesive, for different storage conditions in closed containers. For this, a cartridge, filled with the adhesive, was in each case stored for 7 days at room temperature, at 40° C., and at 60° C., and the extrusion pressure was then measured for each, using squeezing equipment (Zwick/Roell Z005). The cartridge cases were then, following conditioning, opened for 12 hours in normal ambient conditions; a nozzle with an internal diameter of 5 mm was screwed onto the cartridge cases and the force needed to press out the composition, at a speed of 60 mm/min, was measured. The values stated here are average ones, obtained from measurements at extrusion lengths of 22, 26 and 28 mm. The results are shown here in table 2.

TABLE 2

Storability of the adhesives K-1 and K-2.

|  | Adhesive K-1 | Adhesive K-2 |
| --- | --- | --- |
| Extrusion force after 7 d. at RT | 415 N | 503 N |
| Extrusion force after 7 d. at 40° C. | 435 N | 550 N |
| Extrusion force after 7 d. at 60° C. | 483 N | 584 N |

Table 2 shows that the adhesives K-1 and K-2 can be stored, in closed cartridge cases, for 7 days at room temperature, at 40° C., and at 60° C., without appreciable increase in extrusion force.

The storability of the pre-crosslinked adhesives K-1 and K-2 was determined by applying the adhesives in bead-form, to cardboard, by means of cartridge-guns, and subjected to ambient air conditions, so that the first curing stage could begin (pre-crosslinking with moisture). After one day, a test was carried out to determine whether or not the surface of the plastic beads had developed a "skin", that is, a layer of mainly elastic consistency. After 28 days, the beads were tested to see whether they had a mainly plastic consistency, or whether they had cured to form a material of mainly elastic consistency. The adhesives had, here, previously been stored, for 7 days, at room temperature, a 40° C., and at 60° C. The results are shown, in table 3, below:

TABLE 3

Storability of the pre-crosslinked adhesives K-1 and K-2 in ambient conditions.

|  | Adhesive K-1 | | Adhesive K-2 | |
| --- | --- | --- | --- | --- |
| Prior storage | Consistency after 1 d at ambient conditions | Consistency after 28 d at ambient conditions | Consistency after 1 d at ambient conditions | Consistency after 28 d at ambient conditions |
| 7 d at RT | skin | plastic | skin | plastic |
| 7 d at 40° C. | skin | plastic | skin | plastic |
| 7 d at 60° C. | with skin | elastic | with skin | elastic |

Table 3 shows that the adhesives that had been stored, for 7 days, at room temperature and, at 40° C., cured to form a pre-crosslinked material of mainly plastic consistency, and were storage-stable for 28 days. The adhesive that had previously been stored for 7 days, at 60° C., however, formed a skin after a day in ambient air conditions, and finally cured to form an elastic material. This suggests that the surface-deactivated polyisocyanate DI had already been activated during the storage at 60° C., whereby the curing, in the presence of moisture, did not occur in two separate stages, but rather that there was a direct transition to form the cured, elastic adhesive.

The curing in the second curing stage of the pre-crosslinked adhesives K-1 and K-2 was characterized in terms of the development of tensile strength in connection with the heating duration and temperature. For this, first of all, a 2-mm thick layer of the adhesive was exposed to ambient air conditions, for a period of 7 days, whereby the pre-crosslinked adhesive formed. Then the film was heated, for the stated periods, in the circulating-air oven, and at the temperatures, as shown in table 4, before then being exposed to normal ambient conditions for a further period of 7 days, when the tensile strength was finally measured, as described below. The results are shown here, in table 4:

TABLE 4

Curing in the second stage of curing of the adhesives K-1 and K-2: Development of tensile strength in connection with heating duration and temperature.

| Period | Adhesive K-1 | | | Adhesive K-2 | | |
| --- | --- | --- | --- | --- | --- | --- |
| | 100° C. | 120° C. | 140° C. | 100° C. | 110° C. | 120° C. |
| 1 min. | n.c. | 2.0 MPa | 2.1 MPa | n.c. | 3.4 MPa | 5.2 MPa |
| 3 min. | n.c. | 2.3 MPa | 1.8 MPa | n.c. | 5.6 MPa | 5.3 MPa |
| 5 min. | n.c. | 2.3 MPa | 1.9 MPa | 1.9 MPa | 5.5 MPa | 5.2 MPa |
| 7 min. | n.c. | 2.3 MPa | 1.7 MPa | 4.3 MPa | 5.6 MPa | 5.0 MPa |
| 9 min. | n.c. | 2.1 MPa | 1.8 MPa | 4.6 MPa | 5.6 MPa | 4.8 MPa | n.c. = no cure

Table 4 shows that the adhesives K-1 and K-2 cure either over a sufficiently long time-period or sufficiently high temperature. Where heat-supply was too low, curing was either incomplete, or did not occur at all. Where heating was too strong, this partially led to the formation of small bubbles, resulting in slightly lower tensile strength values.

The mechanical properties of the cured adhesive K-2 were, furthermore, also determined. A 2-mm thick layer of the adhesive was here exposed to ambient air conditions for 7 days, whereby the pre-crosslinked adhesive formed. The film was then heated, for 5 minutes, at 120° C., in the circulating-air oven, and was then exposed to ambient air conditions for a further 7 days. 75-mm long dumbbell forms, with a cross-piece-length of 30 mm and width of 4 mm were then punched out, and these were tested in accordance with industrial standard DIN EN 53504, at a tractive speed of 200 mm/min, for tensile strength (breaking strain), breaking elongation and elasticity modulus (at 0.5-5% elongation). The results obtained were as follows:

| Adhesive K-2: | Tensile strength: | 5.2 MPa |
| --- | --- | --- |
| | Breaking elongation: | 810% |
| | Elasticity-modulus (0.5-5%): | 2.6 MPa |

A modular body and from it, a composite body, was further made with the adhesive K-1.

To produce the modular body, a small glass plate, 40×100×6 mm in size, was pre-treated, on the side to be stuck, with Sika® activator (available from Sika Schweiz AG). Following a ventilation period of 10 minutes, the adhesive K-1 was applied, as a triangular bead, measuring approx. 1 cm in diameter along the longitudinal edge, to the small glass plate, and exposed to ambient conditions for 7 days, whereby the pre-crosslinked adhesive, and thereby also the modular body, were formed.

A small cathodic dip-coated sheet-steel was then pre-treated, on the side to be stuck, with Sika® activator (available from Sika Schweiz AG). After ventilating for 10 minutes, the pre-crosslinked adhesive of the modular body was covered with the cathodic dip-coated sheet-steel, pressed together until the pre-crosslinked adhesive was 3 to 4-mm thick, and the latter was then cured in a circulating-air oven for 30 minutes, at 120° C. This gave rise to a composite body, made of glass and cathodic dip-coated sheet-steel with cured adhesive K-2 in between them. After 7 days in ambient air conditions, the adhesion to the glass and the cathodic dip-coated sheet-steel was tested by pulling the composite body apart in a tensile-testing machine, such that the adhesive was extended, until the composite body broke. This gave rise to a 100% cohesive fracture. The adhesion to the glass, and to the cathodic dip-coated sheet-steel, was therefore excellent.

The invention claimed is:

1. Single-component composition SCC that can be cured in two stages, wherein in the first curing stage, a pre-crosslinked composition is produced using moisture and, in a second curing stage, a cured composition is formed by means of heat, the single-component composition SCC comprising:

a) at least one isocyanate polyurethane polymer PUP;

b) at least one blocked amine BA, with at least two blocked amino groups that can be activated hydrolytically; and c) at least one surface-deactivated polyisocyanate DI that is solid at room temperature;

subject to the proviso that the blocked, hydrolytically activatable amino groups, present in the composition, are present as a stoichiometric excess in relation to the number of isocyanate groups of the polyurethane polymer PUP.

2. Single-component composition SCC in accordance with claim 1, wherein the blocked amine BA is a polyaldimine PA having the formula (I),

 (I)

where:
n is 2 or 3 or 4,
A is an n-valent hydrocarbon radical, having from 2 to 30 carbon atoms that, where applicable, contains at least one heteroatom:
Z is free of hydroxyl-, mercapto-, primary and secondary amino groups and is either a moiety $Z^1$, having the formula (II),

 (II)

where:
Y is a monovalent hydrocarbon radical, having 1 to 32 carbon atoms, which, where applicable, has at least one heteroatom, and
$R^1$ and $R^2$ are either,
each, independently of each other, in each case a monovalent hydrocarbon radical, having 1 to 12 carbon atoms,
or together represent a divalent hydrocarbon radical, having 4 to 12 carbon atoms, which, where applicable, is part of a substituted carbocyclic ring, having 5 to 8, carbon atoms,
or is a moiety $Z^2$,
where $Z^2$ is either a substituted or unsubstituted aryl or heteroaryl radical, which has a ring size of 5 to 8,

or is
where $R^0$ is a hydrogen atom or an alkoxy radical or a substituted or unsubstituted alkenyl or arylalkenyl moiety with at least 6 carbon atoms.

3. Single-component composition SCC in accordance with claim 2, wherein the polyaldimine PA is a polyaldimine PA1, having the formula (III),

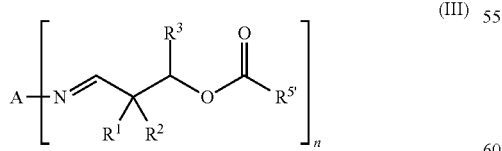 (III)

where:
$R^3$ is a hydrogen atom, an alkyl group or a cycloalkyl or arylalkyl group, having 1 to 12 carbon atoms, and
$R^{5'}$ is either
a linear or branched alkyl radical, having 6 to 30 carbon atoms, where applicable with cyclic components,
or a mono- or polyunsaturated, linear or branched hydrocarbon moiety with 6 to 30 carbon atoms.

4. Single-component composition SCC in accordance with claim 1, wherein the average particle diameter of the surface-deactivated polyisocyanate DI lies in the range from 0.01 to 100 microns.

5. Single-component composition SCC, in accordance with claim 1, wherein the surface-deactivated polyisocyanate DI is obtained from the conversion of a polyisocyanate, which is solid at room temperature, with a surface-deactivating substance that has at least one isocyanate-reactive group.

6. Single-component composition SCC in accordance with claim 5, wherein the polyisocyanate, which is solid at room-temperature, and on which the surface-deactivated polyisocyanate DI is based, is selected from the group comprising naphthalene-1,5-diisocyanate (NDI), 3,3'-dimethyl-4,4'-diisocyanatodiphenyl (TODI), 1,4-phenylene diisocyanate, the isocyanurate of 1-isocyanato-3,3,5-trimethyl-5-isocyanatomethyl cyclohexane, the uretdione of 4,4'-diphenylmethane diisocyanate, the uretdione of 2,4-toluene diisocyanate and toluene and the urea of 2,4-toluene diisocyanate.

7. Single-component composition SCC in accordance with claim 5, wherein the substance used for surface deactivation is a primary or secondary amine, a fatty amine, a polyalkylene amine or a polyamidoamine, and a carboxylic acid salt of these amines.

8. Single-component composition SCC in accordance with claim 1, wherein the surface-deactivate polyisocyanate DI is present in the composition to an extent whereby the ratio of the excess blocked, hydrolytically activatable amino groups of the blocked amines BA to the isocyanate groups of the surface-deactivated polyisocyanate DI is 0.25 to 1.

9. Single-component composition SCC, in accordance with claim 1, wherein the temperature in the first curing stage is below 50° C., and that the temperature in the second curing stage is in the range of 60 to 160° C.

10. Single-component composition SCC in accordance with claim 1, wherein the moisture for the first curing stage is either air humidity or water mixed into the composition.

11. Procedures for bonding a substrate S1 to a substrate S2, comprising the following stages:
i) applying the single-component composition SCC, in accordance with claim 1, to a substrate S1 and bringing the composition into contact with moisture at a temperature below 50° C., so that a pre-crosslinked composition is formed;
ii) heating the pre-crosslinked composition to a temperature in the range of 60 to 160° C., and
iii) bringing the pre-crosslinked composition into contact with a substrate S2;
whereby steps ii) and iii) can also occur simultaneously or in reverse order;
and
whereby the substrate S2 is made of the same or from different material as substrate S1.

* * * * *